(12) United States Patent
Ryu et al.

(10) Patent No.: US 7,613,443 B2
(45) Date of Patent: Nov. 3, 2009

(54) CONTENTS AND INFORMATION PROVIDING SERVICE SYSTEM FOR USING A CODE, USER TERMINAL, COMMUNICATION AGENCY PLATFORM, OPERATING AGENCY PLATFORM, ON-LINE RELATION MEMBER MODULE, AND THE METHOD FROM THE SAME

(75) Inventors: Jung-Hee Ryu, Gangdong-gu (KR); Hyun-Geun Jo, Yangcheon-gu (KR)

(73) Assignee: ICONLAB, Inc., Seoul (KR)

( * ) Notice: Subject to any disclaimer, the term of this patent is extended or adjusted under 35 U.S.C. 154(b) by 549 days.

(21) Appl. No.: 10/539,556

(22) PCT Filed: Dec. 15, 2003

(86) PCT No.: PCT/KR03/02748

§ 371 (c)(1),
(2), (4) Date: Jun. 17, 2005

(87) PCT Pub. No.: WO2004/056026

PCT Pub. Date: Jul. 1, 2004

(65) Prior Publication Data

US 2006/0075026 A1    Apr. 6, 2006

(30) Foreign Application Priority Data

Dec. 18, 2002    (KR) .................... 10-2002-0081484

(51) Int. Cl.
*H04W 4/00*    (2006.01)
(52) U.S. Cl. .................... 455/403; 455/423.3; 455/445; 455/428; 455/564; 455/435.1

(58) Field of Classification Search ......... 455/405–409, 455/411, 414.1–414.3, 428, 432.3, 550.1, 455/552.1, 556.2, 558, 445, 564, 435.1; 709/219, 709/246, 229; 705/26, 37, 16, 39
See application file for complete search history.

(56) References Cited

U.S. PATENT DOCUMENTS

2001/0051915 A1* 12/2001 Ueno et al. .................... 705/39
(Continued)

FOREIGN PATENT DOCUMENTS

KR    1020000054472 A    9/2000
(Continued)

*Primary Examiner*—Kamran Afshar
(74) *Attorney, Agent, or Firm*—Global IP Counselors, LLP

(57) ABSTRACT

Disclosed is a platform for providing users with a variety of contents and information of on-line/off-line interested party using barcode, method for providing contents using the platform, and a billing system and method therefor. A system for providing wired/wireless contents and information using codes includes a communication entity platform for performing an interested party-related log record process that receives code values from the outside to provide contents information corresponding to each code and provides user and contents information; operating agent platforms for receiving the code values from a user device and distributing code information to the respective communication entity platforms; an on-line interested party module for registering resources corresponding to a variety of contents information in the communication entity platform and providing services such as contents to the user device; and an off-line interested party module for receiving a code needed to provide services such as the contents, which is issued by the operating agent platform, and inserting the issued code into an off-line medium so that a user can select information to be associated with the code.

50 Claims, 21 Drawing Sheets

U.S. PATENT DOCUMENTS

2002/0091800 A1* 7/2002 Wilkinson et al. .......... 709/219
2002/0161745 A1* 10/2002 Call .............................. 707/1
2004/0255034 A1* 12/2004 Choi .......................... 709/229

FOREIGN PATENT DOCUMENTS

KR     1020010074624 A     8/2001
KR     1020010094453 A     11/2001

* cited by examiner

1000

1100

1900

| | 2101 | 2103 | 2105 | 2107 | 2109 | 2111 | 2113 |
|---|---|---|---|---|---|---|---|
| | Field | Industrial product | Record | DVD | Book | Game machine and mutimedia | Toy |
| 2115 | Code value | 3458729 | 878696999 | 398902702 | 475673990 | 29984017 | 8789796 |
| 2117 | URL | http://a.c.b | | http://www.i.co.kr/~opo.asf | www.ko.co.kr | www.iwh.com | www.nv.net/~neo |
| 2119 | Basic information 1 | Product name | Artist | Director | Writer | Genre | Manufacturer |
| 2121 | Basic information 2 | Manufacturer | Record | Film producer | Publishing company | Outer shape | Color |
| 2123 | Basic information 3 | Category | Planning company | | Price | Manual | Size |
| 2125 | Extension information 1 | Product photo | Title of song | Actor | Review of book | Character | Character |
| 2127 | Extension Information 2 | Related URL | Sound source | Review of film | Title of book | Item | Materials |
| 2135 | Extension information 3 | | Review of record | Motion picture | Summary | Animation | Motion animation |

FIG. 21

CONTENTS AND INFORMATION PROVIDING SERVICE SYSTEM FOR USING A CODE, USER TERMINAL, COMMUNICATION AGENCY PLATFORM, OPERATING AGENCY PLATFORM, ON-LINE RELATION MEMBER MODULE, AND THE METHOD FROM THE SAME

FIELD OF THE INVENTION

The present invention relates to a platform for providing clients with a variety of contents and information of on-line/off-line interested parties using barcode, method for providing contents using the platform, and a billing system and method therefor.

BACKGROUND OF THE ART

Due to the widespread supply of wireless portable communication devices and development of wireless communication technology, the number of peoples who use a wireless Internet is increased. A need for the use of the wireless Internet in actual life is gradually increased due to development of a variety of contents and improved services.

Furthermore, the number of on-line and off-line operating entities, which provide a variety of contents using the wireless Internet, is gradually increased. The provision of various services using the wireless Internet in the future will further accelerate the activation of a wireless Internet market.

Further, wireless portable mobile phones have been widely provided. The number of people who are connected to the wireless Internet using PCs, PDAs and the like are further increased. In addition, the use of the wireless Internet contents has gradually shifted from a conventional character/melody downloading service field to various service fields such as games, e-mail, broadcasting, entertainment, sports, shopping and so on. In line with these trends, there is a growing need for a variety of contents providing services using the existing wireless Internet to become more universal and accessible.

However, there are still lots of problems in saying that anyone can access the wireless Internet services. In reality, there are lots of problems in saying that a user uses desired information and contents anywhere and anytime without significant limitations.

According to various statistic data, the reason why a user does not use the wireless Internet services usually lies in that the user does not feel the necessity, the fees are high, the use is difficult, and it is not so general and convenient like the wired Internet. In other words, lack of development of a variety of contents that makes a user want to use it, a difficulty in wireless Internet navigation, lack of services that allow the user to access desired contents at a time, are important problems that must be solved.

For example, if a user uses a mobile phone to purchase a movie ticket in advance via a wireless Internet, the user has to input various keys at least 10 times and to pay an expensive communication fee since the access time is taken long.

Furthermore, according to the research by Nielson Norman Group, it was found that most people think the navigation is the most unsatisfactory point in using the WAP (Wireless Application Protocol).

In a wireless portable device, especially a mobile phone, improvements for technical functions have been significantly made for the past several years. Thus, it can be said that a network connection function and a multimedia support function of the wireless portable device recently become almost compatible to those for common PCs. A camera phones having built a camera therein has recently been actively used. Portable devices having a wireless Internet access function, an improved graphic function and an advanced multimedia support environment have been widely used.

However, the infrastructure that can support the functions of the advanced portable device is incomplete and there are some limitations in using the functions of the camera attached to the camera phone. In view of platforms or services, therefore, it is not compatible to the technical development speed of the portable device.

An inventor of the present invention filed a patent application (Korean Patent Application No. 2000-0085811) on Dec. 29, 2000. This discloses a coded pattern and method for extracting codes from patterns, wherein patterns having code information and pattern images are acquired and codes are extracted by means of a camera. In this technology, two-dimensional barcodes are acquired and codes are extracted, by means of a variety of devices having a camera attached thereto.

Furthermore, the present inventor filed a patent application (Korean Patent Registration No. 10-0323759). It discloses a device and method, wherein specific codes are extracted from pattern images using a mobile communication device having built a camera therein, and information is displayed on the device based on the codes or provided via a communication network.

In addition, the prevent inventor filed a patent application (Korean Patent Application No. 2000-0032164) on Jun. 12, 2000. This technology discloses a method and system for providing information on objects, which includes identification symbols that can be read physically. In this prior art, information on objects existing in an actual paper, information on predetermined products, etc. are searched from a virtual paper via a network and are then provided to a user.

The aforementioned conventional arts disclose technology that recognizes various barcode using a camera equipped in a mobile phone, etc. and extracts information from the barcode, information search using the same, and related network related technology.

DETAILED DESCRIPTION OF THE INVENTION

Accordingly, the present invention has been made in view of the above problems, and it is an object of the present invention to provide platforms for providing a user with a variety of contents and information of on-line/off-line interested parties by using a device equipped with a camera and various barcode technologies in using a wireless Internet, method for providing contents using the platform, and a billing system and method thereof.

Another object of the present invention is to provide a system and method for providing services, wherein a variety of contents and services provided by on-line/off-line entities are integrally constructed and schematically managed using the platforms.

To achieve the above objects, according to the present invention, there is provided a system for providing wired/wireless contents and information using codes in a wired/wireless communication service system, including a user device for inputting codes and having an access function to a network; communication entity platforms for performing log record of an interested party that receives code values from the outside to provide contents information corresponding to each code and provides user and contents information; an operating agent platform for receiving the code values from the user device and distributing code information to the respective communication entity platforms; an on-line interested party module for registering resources corresponding to a variety of contents information in the communication entity platforms and providing services such as contents to the user device; and an off-line interested party module for receiving a code needed to provide the services such as the contents and inserting the issued code into an off-line medium so that a user can select information that will be associated with the code.

To achieve the above objects, according to another embodiment of the present invention, there is provided a system for providing wired/wireless contents and information using codes in a wired/wireless communication service system, including a user device for inputting codes and having an access function to a network; communication entity platforms for performing an interested party-related log record process that receives code values from the user device to provide contents information corresponding to each code and provides user and contents information; an on-line interested party module for registering resources corresponding to a variety of contents information in the communication entity platforms and providing services such as contents to the client device; and an off-line interested party module for receiving a code image needed to provide services such as the contents and inserting the issued code into an off-line medium so that a user can select information that will be associated with the code.

BRIEF DESCRIPTIONS OF THE DRAWING

Further objects and advantages of the invention can be more fully understood from the following detailed description taken in conjunction with the accompanying drawings in which:

FIG. 21 shows the configuration of a code database according to an embodiment of the present invention.

BEST MODE FOR CARRYING OUT THE INVENTION

The present invention will now be described in detail in connection with preferred embodiments with reference to the accompanying drawings.

<Code>

Figure 1:
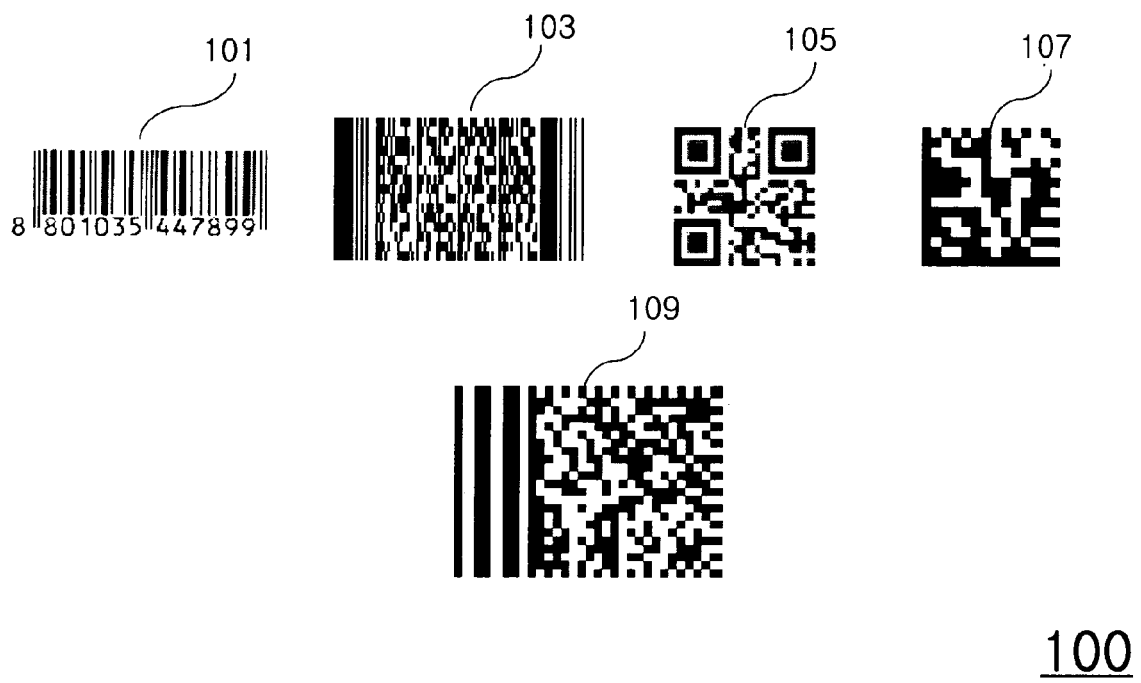
FIG. 1 shows images of various codes, which become media according to the present invention.

FIG. 1 shows images of various codes, which become media according to the present invention.

Codes of the present invention may include a conventional one-dimensional code 101, a PDF-417 code 103 being a two-dimensional code, a QR code 105, a data matrix 107 and the like.

Barcode that is currently usually used mainly includes a one-dimensional barcode, which can represent only simple information. The first code of the codes shown in FIG. 1 is the one-dimensional barcode 101. The one-dimensional barcode 101 is arranged in one dimension in which white bars and black bars having a different thickness are combined. Alphabet, numbers, special characters and the like can be represented using data.

In addition, the one-dimensional code includes UPC (Universal Product Code), EAN (European Article Numbering), code 39, Interleaved 2 of 5, code 93, code 128, Plessey code, code 11, 5 codes of Standard 2 and so on.

A two-dimensional barcode is barcode in which data are arranged in a horizontal axis (X axis) and a longitudinal axis (Y axis). The two-dimensional barcode can represent Korean characters, Chinese characters and drawings, compared to the one-dimensional barcode 101, which represent only alphabets, numbers and limited characters using data. Therefore, the two-dimensional barcode is very superior to the one-dimensional barcode 101 in view of the capacity of data and has outstanding functions in the printing and reading.

Codes that are represented by the two-dimensional barcode include the PDF-417 code 103, the QR code 105, the data matrix 107 and the like.

In addition to the one-dimensional and two-dimensional barcodes, an error correction code 109, a color code (not shown), etc., having an improved error correction function and an extended data capacity can be used in the present invention.

Hereinafter, the error correction code having a strong error correction function and an extended data capacity will now be described.

Codes Having Error Corrected and Data Capacity Expended

The present invention can also employ codes having a strong error correction function and codes whose information amount can be extended by maximum.

The codes include a finding pattern region for demarcating a code region from the entire image, a timing pattern region for perceiving a data region from the entire codes and finding the locations of respective cells in the data region, and the data region to which various data and decoding information of the data itself are inputted, as shown in FIG. 1.

The various barcodes become important media for acquiring resources desired by users, which are used on the entire system.

By using those codes, the users can more easily access desired resources, makes a request for a URL, etc. at a time, and obviate key inputs and unnecessary manipulation using the existing mobile phone.

Contents information and a variety of information related to commerce are coded in the codes. The user can more easily obtain desired resources through simple manipulation that makes the resources recognized in a code recognition means such as a camera, etc. The codes recognized thus are transmitted from a user device to a service system and are then connected to entities for providing the resources, so that desired resources can be provided to the user.

According to another embodiment of the present invention, in addition to an image recognition method using an image input means using a camera, etc., the code recognition process includes inputting codes through a method for directly inputting code values using a character input means such as a keypad of a user device, etc. This will provide a means for receiving the present service even when the user device to be described later is a conventional device not having the image input means.

According to still another embodiment of the present invention, the codes can be recognized by means of a means for reading characters using a camera. This can be implemented using an existing OCR (Optical Character Reader) device. A representative one is an OCR wand. The OCR wand is a miniaturized optical character reader. The OCR wand is a device for reading data printed in optical characters by scanning an account book, a price list, etc. with a reading head held in one hand. This is also called "a hand OCR or OCR hand scanner".

According to a preferred embodiment of the present invention, however, it is required that the user have an image recognition means such as a camera, a scanner, etc. for allowing various a code image to be recognized by the user's system. Further, it is required that a decoding means for decoding the recognized code image to extract code values and a transmission means for transmitting the code values to the entire system, be provided on the part of the user. In addition, an off-line interested party further includes an encoding means for encoding the code image using the code values assigned by a service entity, and a code printing means for printing the code image on various papers, products, etc.

The encoder for encoding the codes and the decoder for decoding the codes will now be described.

According to an embodiment of the present invention, a code encoder may be provided in an off-line interested party module. The code encoder receives code values, which are issued at the request of a predetermined company, and outputs a code image corresponding to the code values in various forms.

The encoder of the present invention supports a variety of formats such as WMF (Windows Metafile Format), EPS (Enhanced Metafile) and BMP (Encapsulated PostScript).

The WMF is a figure file format used to store vector figures in order to exchange the figures among application programs in Windows by Microsoft Corp. Though the WMF is used for bitmaps and texts, it is usually used as a vector figure file format since the WMF includes Window commands (GDI function call) for drawing figures. Its program is used as a file format to temporarily store information between sessions. An extension WMF is attached to a file name having a WMF format of 16 bit version. An extension EMF is attached to a file name having an EMF format of a 36 bit version.

The EPS is a graphic file format used in a PostScript language. The EPS file may have a binary or ASCII format. The EPS is usually a file in which graphic data are recorded in the bit mat format in order to represent a screen. On the contrary, a common PostScript file has only PostScript commands to output the figures to the printer. The PostScript is a programming language that represents the shape of a printed page. This is developed by Adobe Systems Incorporated in 1985 and becomes an industry standard in printing and image. Most printer manufacturers produce printers having built PostScript software, which can be implemented in major operating system platforms, therein, or onto which the PostScript software can be loaded. The PostScript file has an extension of ".ps", so that it can be easily discriminated.

Figure 2:
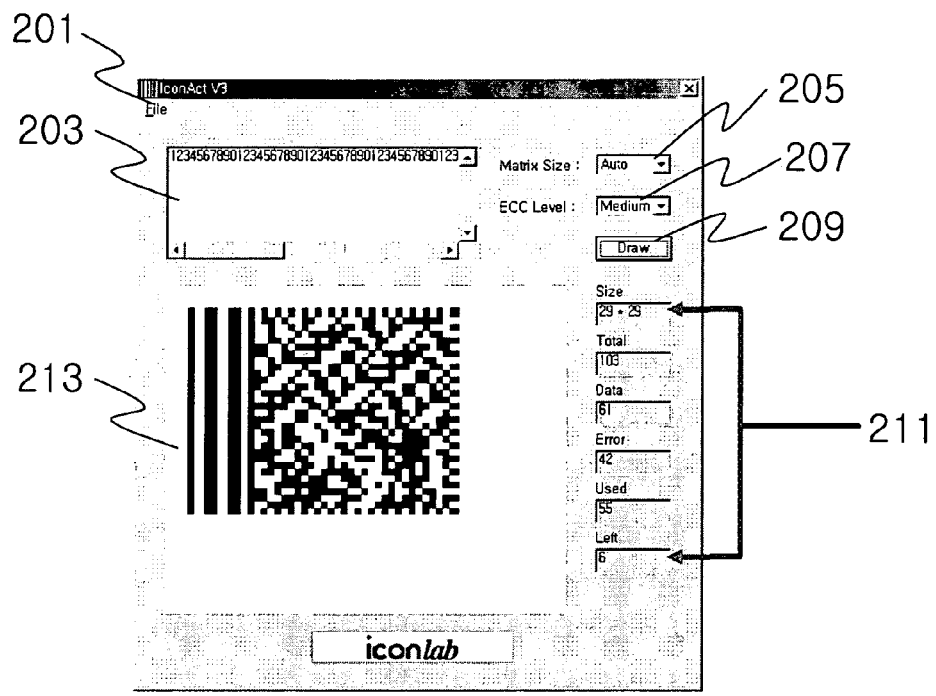
FIG. 2 shows an encoding program according to an embodiment of the present invention.

FIG. 2 shows an encoding program according to an embodiment of the present invention.

A program screen shown in FIG. 2 includes a file storage menu 201, a data input window 203, a code matrix size specification menu 205, an error correction level specification menu 207, a code output button 209, a code information menu 211, a code output window 213 and the like.

The file storage menu 201 has a full-down menu format, whereby menu of the entire programs can be implemented. The data input window 203 is a command window for inputting data inputted to codes. The data input window 203 may be omitted since index codes are automatically generated.

The matrix size specification menu 205 serves to control the size of an image by specifying the size of the matrix supported by an encoding program depending on situations.

The ECC level specification menu 207 is a menu for inputting a command to control an error correction level in a code. For example, error correction levels may be 10%, 20% and 30%.

The code output button 209 is an output command input window for executing a printing command to print a code image.

The code information menu 211 records code information therein, such as the size of a code image, data input information, error correction level information, use information, remaining information and the like.

The code output window 213 visually outputs data inputted to the data input window as a code image, and supports "cut and paste".

The "cut and paste" is one of schemes, which are used to edit data in document programs, statistic programs, graphics programs, etc. In the "cut and paste", the range of a desired degree is specified to data, cut, stored in a storage means and attached to other places.

Encoding

A conventional code encoding method employs an existing encoding method. The encoding method for codes whose error is corrected and whose data capacity is expended is as follows.

Encoding information is first inputted.

The encoding information may be data to be encoded, the size of a cell, an ECC (Error Correcting Codes) level and the like.

The number of an entire codeword, the number of a data codeword and the number of a RS (Reed-Solomon) codeword are then determined based on an encoding information input value.

A RS (Reed-Solomon) codeword is generated using the received data and Pad Character.

Pad Character is a value that does not affect Output Character and refers to a Dummy value added to an empty paper other than data.

The data are encoded. The data are encoded in an ASCII encoding mode. If consecutive two numbers are found, the data are encoded as a double density. If Korean is encoded, the mode is switched to a Korean encoding mode. The Korean language supports a 2350 completion type Korean according to the rules of KSC 5601-1987. 12 bit encoding is used every Korean character.

According to a preferred embodiment of the present invention, if the number of the entire cells in the data region is 9×9 (=81), i.e., 81 or more, BCH codes are added in front of the code according to the ECC (Error Correction Code) level. Further, in a high ECC level, the BCH codes are additionally overlapped. 7×7 and the size are fixed to the ECC level.

The data encoded by the encoding process are blocked.

Decoding

The code decoder of the present invention is provided in the user device. If a user makes an image recognized to the decoder using the image recognition means such as the digital camera, the device's decoder extracts code values from the recognized a code image through a decoding process. The process of decoding the code values is carried out in the decoder.

If a method for inputting code values using a character input means such as a keypad of the user device according to another embodiment of the present invention is used, it is not required that the decoder be provided. The decoder is required when the method for inputting a code image using an image input means according to another embodiment of the present invention is used.

The existing one-dimensional and two-dimensional barcodes employ the conventional decoding method. The codes whose error is corrected and whose data capacity is extended according to the present invention, are decoded by the following method.

Images are scanned using a scanner or a camera.

According to a preferred embodiment of the present invention, the image scan is performed in a raster scan mode. The raster scan mode includes scanning images by scanning horizontal raster having dots or pixels as if lines are dragged one by one from the top to the side. Unlike the raster scan, to freely scan images as if the images are drawn using the pen is called a vector scan mode. In some cases, the vector scan mode may be used and the image scan process may use a variety of methods depending on the decoding system.

A finding pattern is checked through the scan process.

A plurality of horizontal scan lines are extracted from the inputted images to determine whether there is a finding pattern.

If the finding pattern is not found after the horizontal scan process, it is determined whether the finding pattern does exist by extracting vertical scan lines.

On the contrary, if the finding pattern is found through the scan process, the inclination of the finding pattern is induced based on information in which the location of the finding pattern is written. The inclination of the entire symbol is induced based on the induced inclination information.

If the finding pattern is not searched, the images are scanned again.

After the finding pattern is searched to induce the inclination of the entire symbol, a timing pattern is searched.

If the timing pattern is searched, the location of the entire symbol is calculated using the search result.

It is possible to obtain the location and inclination of the entire symbols through the timing pattern search. Furthermore, it is possible to decode normal codes through the search of the finding pattern and the timing pattern even if images whose top/bottom and right/left are turned upside down or mirror shape images are acquired.

The location and inclination of the entire symbol using the finding pattern and the location and inclination of the symbol using the timing pattern are fine-tuned.

The number of elements in the data region is also obtained in this process.

Lattice coordinates of the data region are extracted using coordinates, which are composed on the basis of respective locations of the timing pattern obtained in the fine-tuning process.

A bit pattern wherein black is "1" and white is "0" in the data region is obtained.

The BCH code is extracted from the obtained bit pattern.

In addition, data and RS code are extracted from the bit pattern.

An error level of the RS code is determined based on the BCH code obtained in the process of extracting the BCH code.

A data codeword is obtained from the data and RS code, which are obtained by the process of extracting the data and RS code.

The obtained data codeword is decoded.

The decoding process is performed to output a final output.

The code decoder according to the present invention supports a variety of one-dimensional and two-dimensional symbology and implements an engine using Pure C or Java, whereby porting is possible even in any platforms and virtual machines to be described later such as BREW, WITOP, WIPI and J2ME. Furthermore, the code decoder according to the present invention has the function of supporting the OS (Operating System) for a variety of mobile devices and can recognize barcodes even in a camera of a low resolution. Above all, the decoder has a high processing speed even in a system environment of a low profile.

The entire structures and functions of each system will be below described in detail by the system and module with reference to the accompanying drawings.

<Entire System (Distributed Platform System)>

Figure 3:
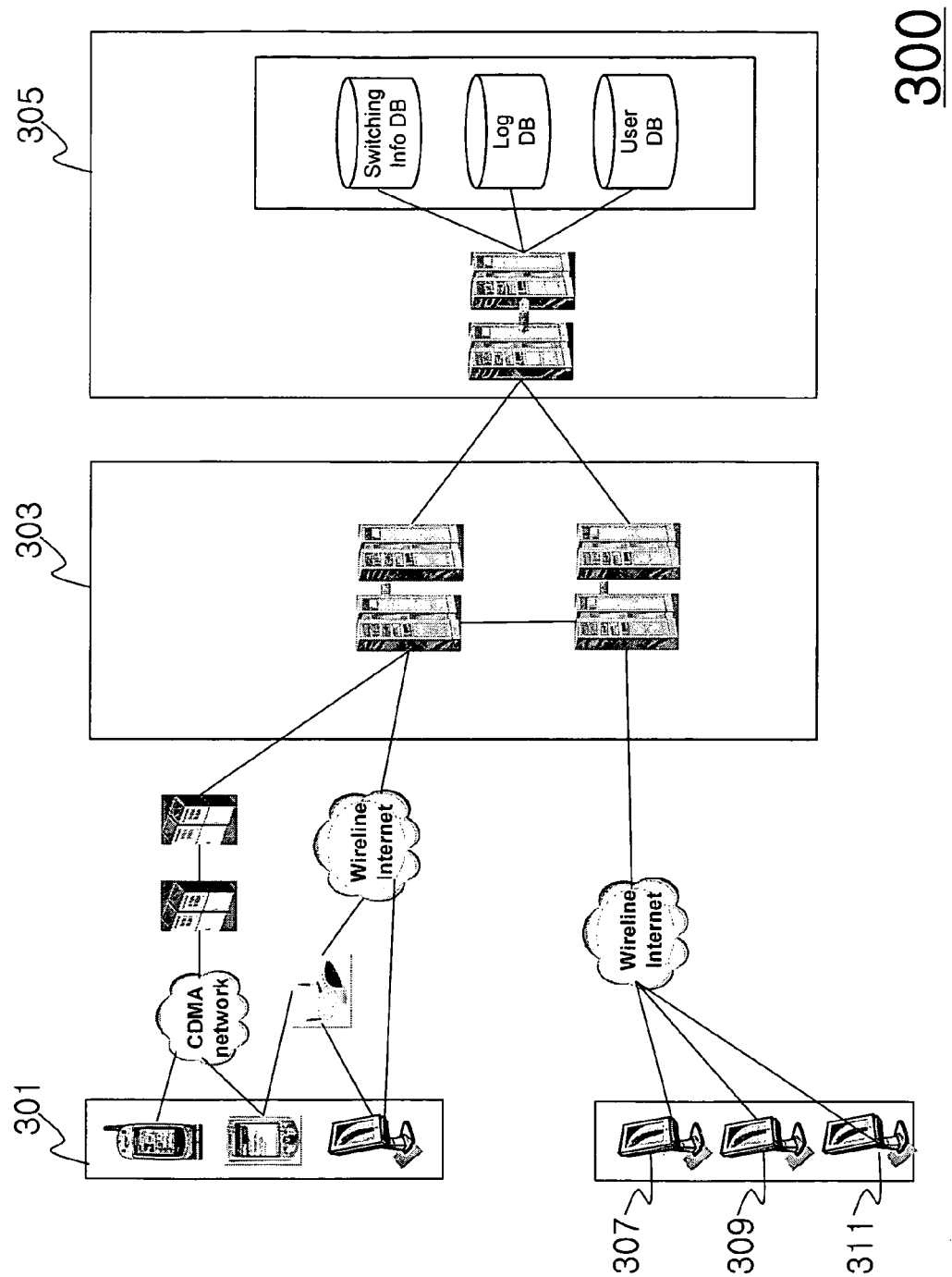
FIG. 3 is a view illustrating the configuration of the entire system according to the present invention.

FIG. 3 is a view illustrating the configuration of the entire system, which is divided into an operating agent platform and a communication entity platform according to the present invention.

In the above, the platform usually refers to hardware or software, which becomes the basis of a computer system. The computer system is a hierarchical apparatus in which a hardware layer of an integrated (IC) chip level being the lowest layer, a firmware and OS layer, and an application layer being the highest layer, are sequentially stacked. In the hierarchical apparatus, the lowest layer is called the platform. In some cases, however, both the hardware and software are also called the platform. This is because the hardware and software provides a support for the application.

The term "platform" as in the operating agent platform and the communication entity platform used in this context may be defined as a group, which can provide services of an independent unit in which a function execution means and respective modules are collected. In other words, the operating agent platform may be defined as a group for performing business acting for an actual service operation. The communication entity platform may be defined as a group for performing relay, various service functions and business between a contents service requester and a contents service provider. It is therefore more preferred that the platform be defined with it divided into a collection of functions and modules, rather than dividing the platform with a physical construction. A detailed structure of each platform will now be described centering on the functions and modules with reference to the drawing.

The entire system according to the present invention includes a user device 301, an operating agent platform 303, a communication entity platform 305 and on-line/off-line interested party modules 307.

The on-line/off-line interested party module 307 may be the on-line interested party module 309 or the off-line interested party module 311. The on-line interested party module 309 and the off-line interested party module 311 may be integrally operated.

Furthermore, the on-line interested party module 309 and the off-line interested party module 311 may be disposed outside the operating agent platform or the communication entity platform. According to another embodiment of the present invention, the on-line interested party module 309 and the off-line interested party module 311 may be constructed as an internal module of the communication entity platform or the operating agent platform.

Each module shown in FIG. 3 may be constructed using a network including a CDMA communication network, a wireless communication network and the like.

Each of the modules in the entire system will be described in more detail.

User Device 301

Figure 4:
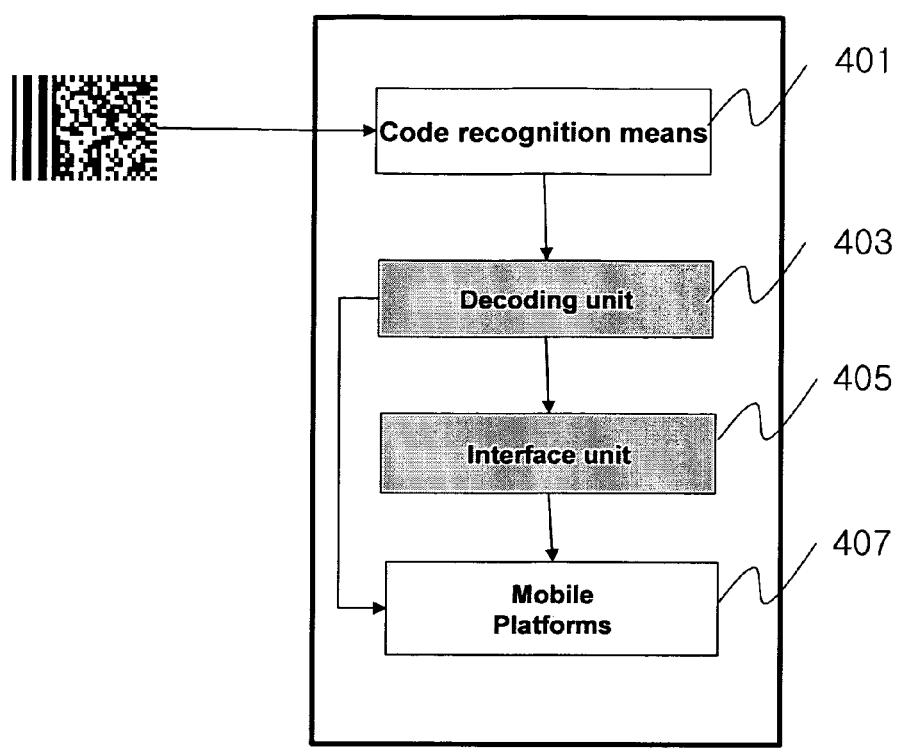
FIG. 4 is a block diagram schematically illustrating the construction of a device module on the part of a user.

FIG. 4 is a block diagram schematically illustrating the construction of the device module on the part of a user.

The user device 301 on the part of the user usually refers to a device for inputting barcode, which can be connected to the network. Preferably, the user device usually refers to a portable device, and has a display unit for displaying barcode and a network interface unit.

Furthermore, the user device of the present invention refers to a device which can be carried by a user and perform wireless mobile communications and information processing. A representative user device may include a portable telephone, a PDA, a portable computer having a wireless LAN mounted thereon, which will be described later, and the like. The user device may further include other devices having communication and information processing functions.

The user device of the present invention includes a code recognition means 401, a decoding unit 403, an interface unit 405 and a mobile platform 407.

The term "platform" on the user device is different from the group of the function and modules for performing an independent business function on the entire system defined above.

In other words, the platform on the user device refers to a kind of environment, which operates between the OS and applications and assists the execution of the applications. Hereinafter, the term platform as in the mobile platform, etc. is used to refer to execution environment and is different from the term described above.

The code recognition means 401 has a function of making code values or a code image recognized by using a character input means of a keypad, etc. in a user device, or an image recognition means. In other words, a representative code recognition means is a code value input means using a keyboard, an image recognition means using a camera, etc., an optical character reading means using OCR, etc., or the like.

In the above, the image recognition means may be an external type or a built-in type of the user device. The image recognition means serves to capture a code image from an external object in which various codes such as barcode recognized physically are written and to transfer the captured a code image to the decoding unit 403 of the user device. The code image input means 401 may include a photo sensor, a scanner, a PC camera, a digital camera, a web camera and so on.

According to a preferred embodiment of the present invention, the user device is a wireless portable communication device, and the code recognition acquisition means 401 has a CCD/CMOS camera provided in the portable device and an interface that can be associated in software.

The decoding unit 403 serves to capture images and extract code values, when the code input means 401 is an image input means.

According to a preferred embodiment of the present invention, if the user device is a wireless portable communication device, the decoding unit 403 has a one-dimensional or two-dimensional cord recognizer which is ported in software in the OS of the user device, a local wireless Internet standard platform or the like.

A representative one of the wireless Internet standard platform includes platforms such as BREW, WITOP, WIPI, etc. or a virtual machine such as J2ME, GVM, etc. This will be described in more detail with reference to the mobile platform 407 below.

The interface unit 405 is a module for transmitting code values extracted in the decoding unit 403 to the operating agent platform 303 and receiving contents provided by the on-line/off-line interested party, various resources such as URL of mobile commerce.

In a mobile portable communication according to a preferred embodiment of the present invention, the interface unit 405 cooperatively operates along with the mobile platform 407 mounted in a mobile to transmit the code values to the mobile platform 407.

The mobile platform 407 further includes a constituent element when the user device is a mobile device. The mobile platform 407 serves to reproduce a variety of contents and support mobile commerce.

In the above, the mobile platform 407 refers to a module for implementing various applications driven by codes. In other words, the mobile platform includes a web browser, a VOD player, a platform such as BREW, etc., VM (Virtual Machine) such as GVM and the like.

A web browser refers to an application program used to search World Wide Web (WWW) information in the Internet and is simply called the browser. Though an Internet access function is not included in the browser itself, web sites in worldwide web servers can be connected through the operation of the browser only if software for Internet connection such as Windows is set. WAP (Wireless Application Protocol), UP, ME and the like are used as a web browser embedded in a mobile platform, considering the memory capacity and characteristics of wireless data communications unlike a web browser used to access an existing wired Internet.

The WAP is a protocol whose amount of data processed is simplified in order for the function similar to a wired Internet browser (Explorer) to be implemented in a LCD and a mobile device of a limited memory capacity. The protocol defines rules required to transmit and receive data in an efficient, rapid and correct manner when a computer and a computer or a device and a device make communication each other. The protocol uses XML (eXTENSIBLE Markup Language) using WML (Wireless Markup Language), which is suitable for mobile communications having a limitation and low band of a wireless device. The WAP may be implemented even in a wireless data communications, short message service (SMS) and the like. The WAP has becoming the standard of the wireless Internet services, which require safe application and communication, a hierarchical and scalable structure, generality such as optimization being an efficient use of a device. A version 2.0 of the WAP, which is based on the support of XHTML (eXtended HTML), has recently been released. In the WAP of this version, security (security function between End to End), MMS (Mobile Multimedia Service) support, MLS (Mobile Location Service), PIM (Personal Information Management) and the like have been improved, compared to the existing WAP of a 1.2 version.

UP or HDML (Handheld Device) is a language that is made in order to connect to a portable device (mobile device) whose memory, screen size and input method are relatively smaller than the desktop. The language is almost similar to an existing HTML, but has a structure optimized in the wireless Internet. In other words, it can be said that HDML is a collection of commands and sentences, which define a method wherein wireless Internet devices such a mobile phone interacts with a user.

ME (Mobile Explorer) is a wireless Internet browser that is developed for use in a mobile phone device. Since the ME employs mHTML of a partial collection wherein HTML is simplified as a contents writing language, it can represent HTML documents of an existing wired Internet. The ME can be connected directly to a web server using an existing HTTP protocol since it does not need a gateway unlike the WAP and can support functions such as cookie, bookmark, etc like a wired Internet. It is expected that the ME will support both the HTML and the WAP, and even a wireless OS of a device as a smart phone.

A VOD (Video On Demand) player is services that have been developed by one step from existing text oriented services, and refers to a device in which a user can selectively receive desired multimedia information from a server and reproduce the received multimedia information. A transfer mode of the VOD service includes a downloading mode and a streaming mode. The downloading mode is a mode for downloading desired contents from devices and reproducing the downloaded contents. This mode has an advantage that it can execute contents at any desired time even when communications are disconnected. The downloading mode, however, has disadvantages that a standby time for downloading is long and lots of a storage space is needed in a VOD device. On the other hand, the streaming mode is to reproduce contents in a connected state. This mode is similar to a method in which Window Media Player of a computer first buffers data by some degree and then reproducing the buffered data on a screen. This streaming mode has advantages that a standby time for reproducing contents is short and a storage space is not necessary other than buffering. This mode, however, has a disadvantage that some of data may be lost depending on transmission environment.

A MPEG (Moving Picture Experts Group) 4-based VOD dedicated chip user device being a multimedia coding method, which is most widely used in the Internet, has been used in the VOD service. Furthermore, since lots of calculations are required in processing multimedia, an operation-processing unit for processing VOD services is required in the VOD device, in addition to the existing modem chip (including CPU). Generally, MSP-1000 (Mobile Station Processor-1000) of an ARP series or Qualcomm Incorporated and the like is used. Therefore, in view of a device, the amount of consumption in the battery is greater than the existing device since the unit for processing the multimedia operations is added and a VOD function is implemented.

BREW is a wireless multimedia platform of KT Freetel Co., Ltd. The BREW is services having significantly improved ultra-high multimedia function compared to an existing second-generation wireless Internet services. The BREW servers as middleware, which executes services such as a color screen and 3-dimensional graphic environment, streaming, software downloading having a strong compatibility. An existing ME browser has lots of difficulties in providing multimedia services that require a high speed and colorful graphics. For this reason, even a wireless dedicated web browser requires a strong browser such as Windows in the ME as if the OS has changed from DOS to Windows. In other words, as if DON being the conventional OS is changed to Windows, a new OS is required in order to provide colorful graphics and motion picture services even in a mobile phone.

The virtual machine does not refer to a computer that really exists, but to the appearance of a computer that looks as if it exists as a complex of hardware and software. In case of a computer having the BASIC interpreter, a user may think that the computer uses the BASIC interpreter. In reality, however, the interpreter uses a machine language to interpret the BASIC program. The virtual machine for use in a device is GVM, KVM, XVM and so on.

The GVM is a virtual machine for a device and provides environment and related SDK, which download programs written in VM SDK and develop games or other applications scripts such as stand alone, PTP, MUG or the like. SWAP (SINJI Wireless Application Plug-in) used in the GVM is a program script downloading solution for a mobile phone, and can execute, on the mobile phone, a variety of contents such as games that are downloaded via a wireless Internet. The SWAP scripts may be composed of a compressed C language unlike KVM (K Virtual Machine) of Java. The SWAP module uses SVM of the capacity smaller than KVM.

The KVM is a Java virtual machine, which is designed using K Java so that it is suitable for wireless devices having a small memory capacity such as handheld PC or mobile phones. If KVM is mounted in a mobile phone, it provides dynamic graphics unlike the WAP protocol that can transmit/receive only text-based data. Furthermore, the WAP can transmit/receive a small amount of data, whereas the K Java solution downloads execution files from devices and uses applications such as games without connection to a mobile communication network, whereby data communication fees can be saved. The K Java solution has been serviced in the name of JavaStation, wherein a multimedia downloading function is enhanced based on J2ME (Java 2 Micro Edition) for a mobile of a contracted version of Java. JavaStation is a system for wireless Internet, which can execute a variety of games and applications written in Java on a mobile phone, even with a flash memory of a capacity of 300 KB and a main memory of a capacity of 64 KB.

The XVM is mounted in a mobile phone as Java 2 Platform, Micro Edition (J2ME) based on CLD and MIDP, which is a world standard for a mobile communication device such as a mobile phone and a PDA. The XVM follows Java specification. Its actual implementation of XVM does not use the sources of Sun Microsystems Inc., but an independently written Java platform. In Korea, SK Telecom Co. Ltd. provides an extended API (Application Program Interface), MDP (Mobile Information Device Profile) standard support and the like, using XVM in the name of "N TOP Magic".

The wireless Internet platform described above provides a convenient UI (User Interface) to increase a user's convenience. Though existing browser-based services can support only simple images such as texts, multipack can provide application-based multimedia contents and can install and delete applications. Therefore, there is an advantage in that personalized wireless Internet services can be provided.

In the present invention, the platform described above can be suitably ported depending on system specification of a service provider to which a portable device belongs. It is, however, to be noted that the platform is only illustrative, but does not limit the scope of the present invention.

In addition to the constituent elements shown in the FIG. 4, the user device has a display unit, a power unit, a memory unit, a controller and so on, which are provided in a common device. The description made in the above corresponds specific constituent elements of the present invention for allowing a user to access a contents providing system and to request/receive desired contents.

<Operating Agent Platform (Relay Server Connecting Service Provider and User and Database 303)>

Figure 5:
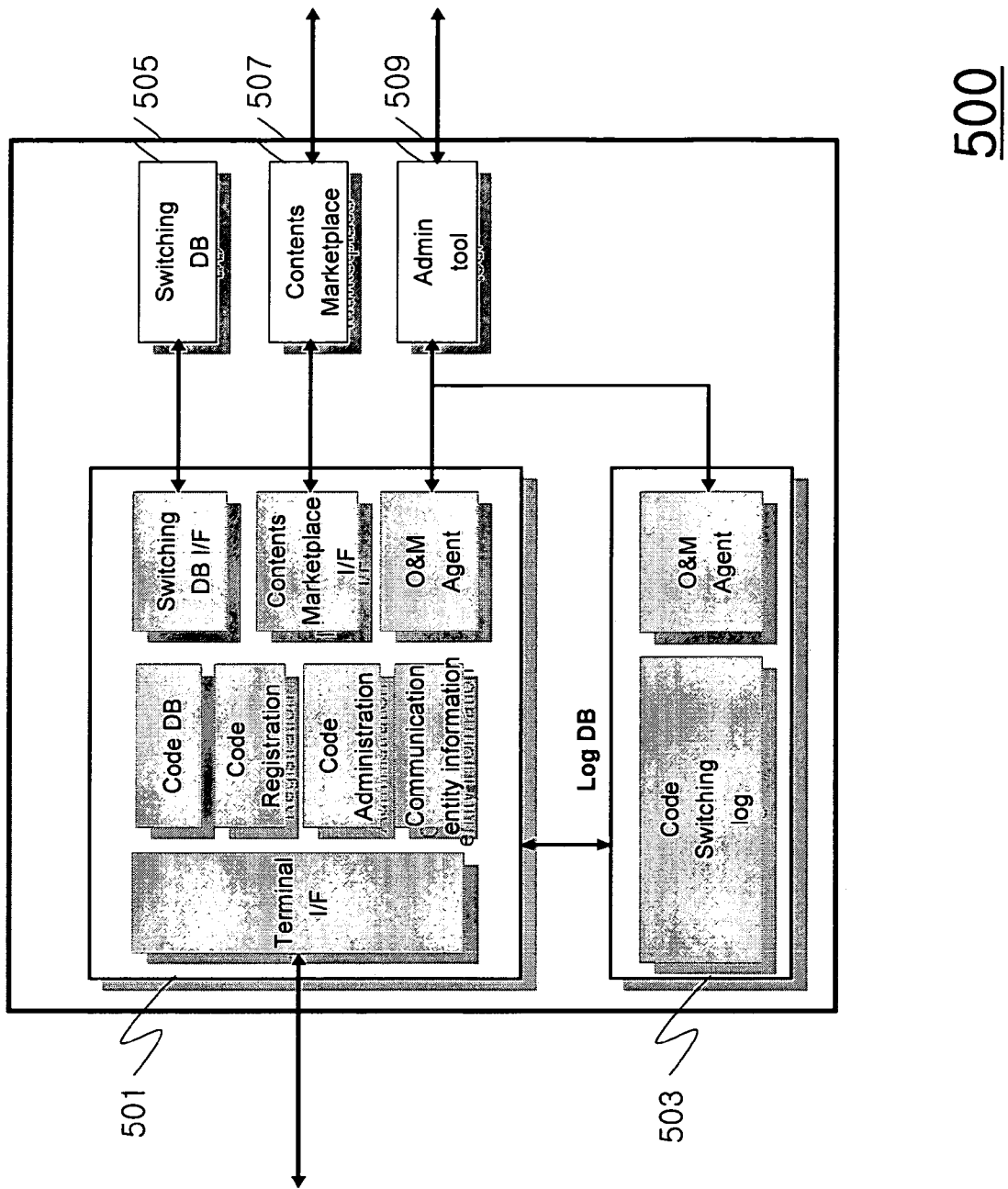
FIG. 5 is a block diagram illustrating the structure of in an operating agent platform.

FIG. 5 is a block diagram illustrating the structure of the platform 303 in the operating agent platform of the entire system shown in FIG. 3.

The operating agent platform 303 includes a switching gateway 501, a log database (DB) 503, a switching database (DB) 505, a contents marketplace 507 and an administration module (Admin Tool) 509.

The operating agent platform 303 serves to issue codes of an off-line interested party and distribute code information to a communication service provider. Furthermore, the operating agent platform 303 serves to manage the entire system, perform system maintenance and solve system malfunction.

Hereinafter, respective constituent elements of the operating agent platform 303 will be described in detail.

The switching gateway 501 receives a code value from the user device 301 and distributes code information to platforms of the communication service provider. In other words, the switching gateway 501 connects codes received from the interface module 305 of the device to a distributed switching database of a corresponding communication entity based on information on the device. Therefore, the distributed switching database of a communication service entity connected to the switching gateway 501 may be in plural.

Figure 6:
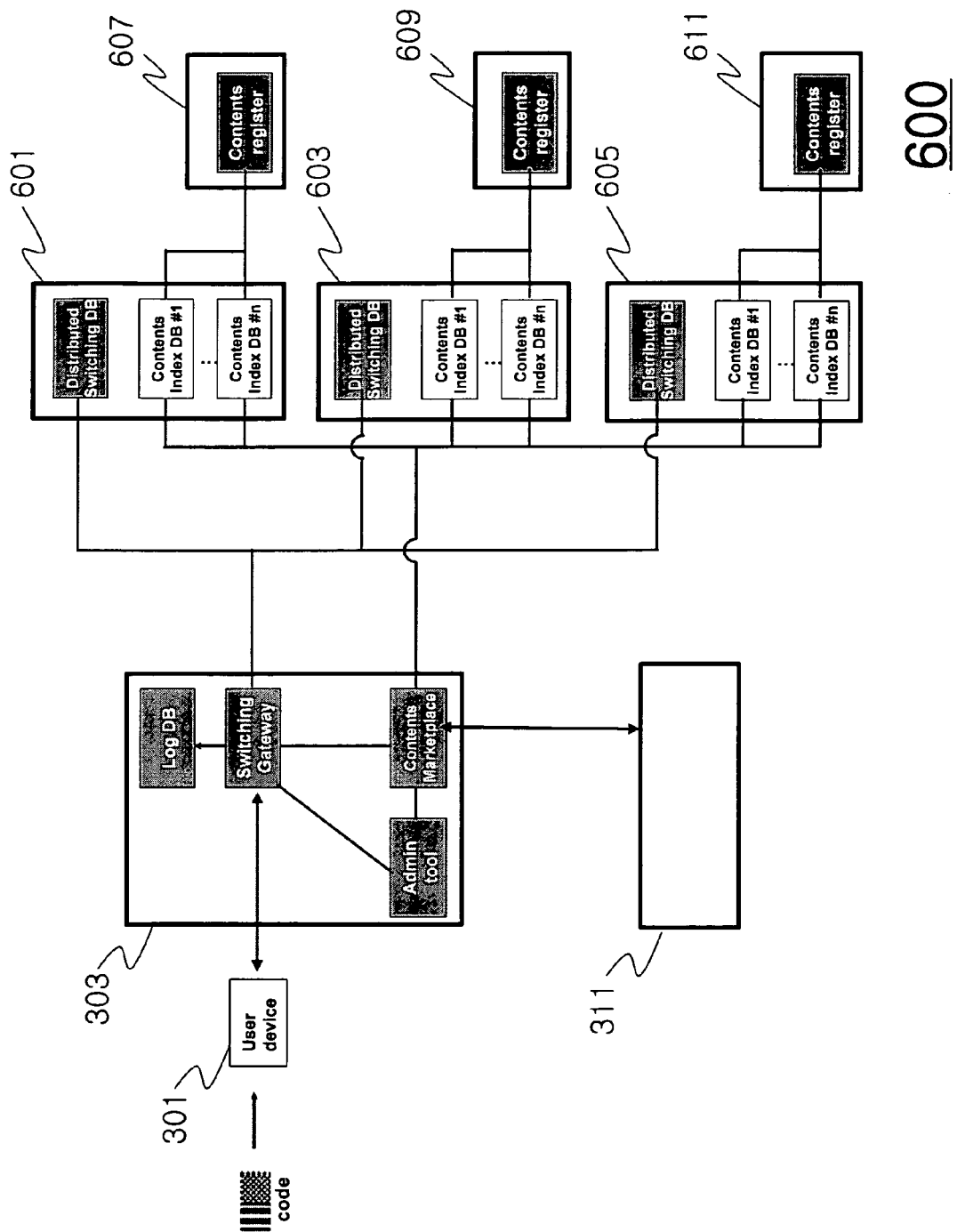
FIG. 6 is a block diagram schematically illustrating the construction of a channel extension service system, which is operated with a plurality of communication entity platforms in the entire system of the present invention.

FIG. 6 is a block diagram schematically illustrating the structure in which a communication service entity connected to the switching gateway 501 of the operating agent platform is extended to a plurality of entities.

Through the user device 301 and the operating agent platform 303 are constructed in the same manner as in the system shown in FIG. 3, a plurality of communication entity servers are connected to the switching gateway 501 of the operating agent. FIG. 6 shows an extended channel in which three communication entities 601, 603 and 605 are connected to a distributed switching database. Furthermore, contents providers 607, 609 and 611 associated with the communication entities are connected to contents index databases of the communication entities, respectively, to provide contents.

The switching gateway 501 in the extended channel serves to perceive code and communication entity ID from a user and to send the code to a distributed switching database of a corresponding communication entity.

The log database (Log DB) 503 is connected to the switching gateway 401 and serves to have a variety of data such as the use state of the switching gateway recorded therein. Database fields may include the use time, a code, an ID of a communication entity and so on.

The switching database 505 serves to receive a corresponding code through the switching gateway 501 and return, to the switching gateway 501, resources such as URL corresponding to services such as contents, commerce, etc. which are information corresponding to the codes. Such a switching database 505 is disposed in the platform system of the operating agent, separately from the switching gateway 511, as shown in FIG. 5. According to another embodiment of the present invention, the switching gateway 501 and the switching database 505 may be integrally operated.

An embodiment that the switching gateway 501 and the switching database 505 are integrally operated as a single one will be described with reference to FIG. 12.

The contents marketplace 507 cooperatively operates along with a code register of an on-line interested party and a contents index database in a platform of each of the communication entities. The contents marketplace 507 serves to search contents of the on-line interested party 309 in which the off-line interested parties 311 are in a partner relationship on the basis of a web so that data to be linked to codes, which are written in an off-line medium, can be more easily selected.

The registration administration module 509 serves to register and administrate on-line and off-line interested parties. The registration administration module 509 performs the process of registering and administrating interested parties by using registration and management tools of on-line interested and off-line interested parties in association with the switching gateway 501 and the contents marketplace 507.

The functions and structure of the contents marketplace 507 and the registration administration module 509 will be described with reference to FIG. 7.

Figure 7:
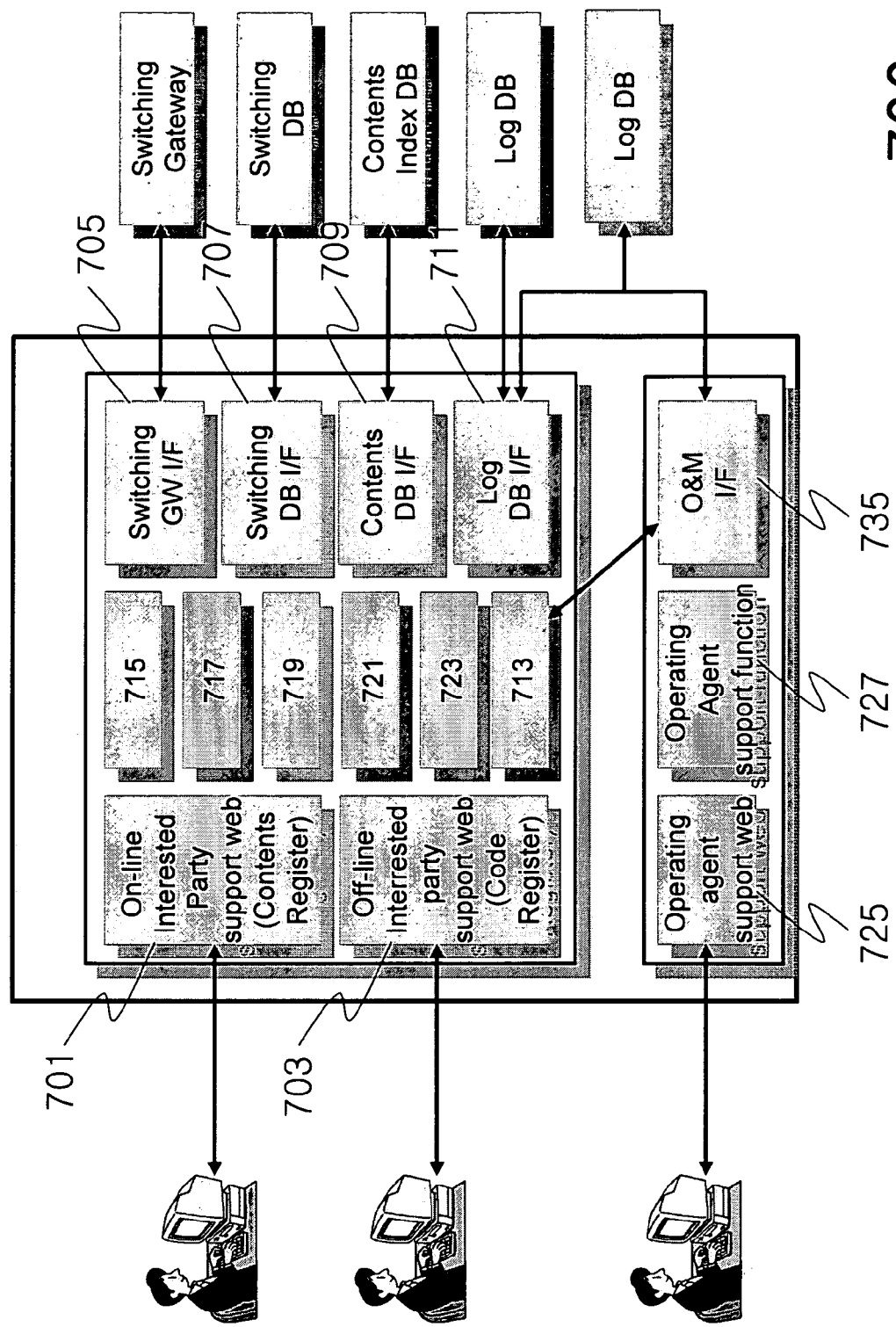
FIG. 7 is a block diagram illustrating the constructions of a contents marketplace and a registration administration module in the operating agent platform shown in FIG. 5.

FIG. 7 is a block diagram illustrating the constructions of the contents marketplace and the registration administration module in the operating agent platform shown in FIG. 5.

The contents marketplace 507 cooperatively operates along with an on-line interested party, an off-line interested party and an operating agent entity, all of which are a CP (Contents Provider). The contents marketplace 507 cooperatively operates along with the switching gateway 501, the switching database 505, the contents index database, the log database of the platform system and the registration administration module 509, in hardware. The contents marketplace 507 has a plurality of interface units for connection to an external system in hardware. In concrete, the contents marketplace 507 includes web interface units 701 and 703 for supporting on-line and off-line interested parties, a switching gateway interface unit 705, a switching database interface unit 707, a contents index database interface unit 709, a log database interface unit 711 of a communication entity and an operating agent, and a registration administration module interface unit 713. The contents marketplace 507 further includes a contents search module 715, a code issue module 717, a payment and billing module 719, a statistic processing module 721, an interested party administration module 723 and an O&M (Operating & Management) agent unit.

The contents marketplace 507 performs a contents search, code issue, payment and billing, a statistic processing, interested party management and operation, and management functions, by using an internal functional module.

The on-line/off-line interested parties are connected to the contents marketplace 507 via the on-line/off-line support web interface units 701 and 703 of the contents marketplace 507. The on-line/off-line interested parties perform functions for various services and system management by using the function of the internal functional module. Further, the internal functional module can make communications with other modules via respective interface units.

The registration administration module 509 includes the web interface unit 725 for supporting the operating agent, the operating agent support module 727, and the O&M interface unit 735 connected to the contents marketplace 507. The module 509 performs an operating agent support function.

Communication Entity Platform 305

Figure 8:
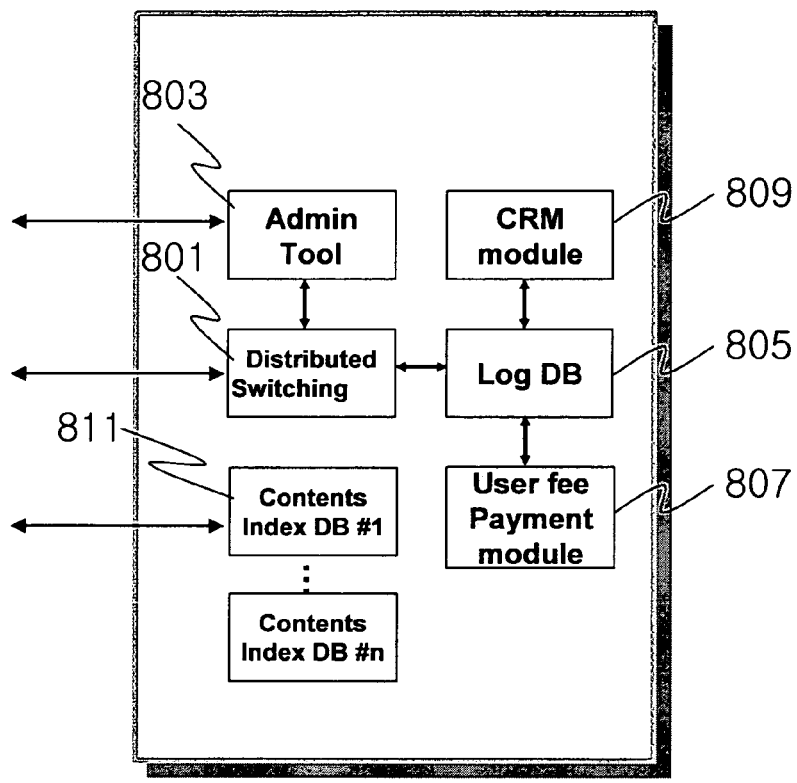
FIG. 8 is a block diagram illustrating the detailed construction of the communication entity platform.

FIG. 8 is a block diagram illustrating the detailed construction of the platform of the communication entity platform in the entire system shown in FIG. 3.

The communication entity platform 305 serves to provide a user with contents information corresponding to each code and record logs related to the user and interested parties.

According to an embodiment described with reference to FIG. 8, the structure of the platform 305 in the communication entity includes a distributed switching database DB 801, a distributed switching database administration module 803, a log database 805, a user billing payment module 807, a CRM module 809 and a contents index database 811.

The distributed switching database 801 is a database in which various resources such as code values, contents and URL are stored/recorded in cooperation with the switching gateway 501 of the operating agent platform. The data fields include resources such as code values, URL and various addresses.

In the above, distribution means that the switching database can be distributed to a plurality of communication entity platforms. Therefore, the distributed switching database and the switching database actually means whether a channel is extended. Even it is simply referred to as a switching database, the meaning of the switching database is same as the distributed switching database in the present invention.

The distributed switching database administration module 803 performs the function of administrating the distributed switching database 801.

The log database 805 stores the use time, etc. of the distributed switching database 801 therein. Data fields may include the use time, a user, a code and various resources information, etc.

The user billing payment module 807 performs the function of paying the fees during a predetermined period by the user by use of a log of the user. The payment module 807 may cooperatively operate along with the billing system of the present invention.

The CRM (Customer Relationship Management) module 809 performs a variety of CRMs by using user logs and vital statistic data. In the above, the CRM refers to the term indicating a methodology, software, etc., which are required in order for the entities to manage customer relationships. The CRM refers to a customer-oriented business scheme wherein information materials for current customer and potential customers are analyzed and changed to marketing information to index a customer's purchase related behavior, and a marketing program is developed, implemented and modified based on the marketing information. In other words, the CRM is a module for writing various statistic materials for user environment by the user and providing them to a marketing manager, so that they can be used as various index and materials.

The contents index database 811 is a database for storing therein all the contents that can be connected to codes so that off-line interested parties can select contents to be connected to the codes. If an existing database for a web is constructed in a predetermined communication service providing company, it can be used as the contents index database 811. In this case, it is not required that additional database be constructed. Database fields may include various resources such as a title, description and URL, summary information, preview information, etc. The preview information in the database field refers to simple previous information, which can be confirmed before figures, bell sound and motion pictures are selected.

Figure 9:
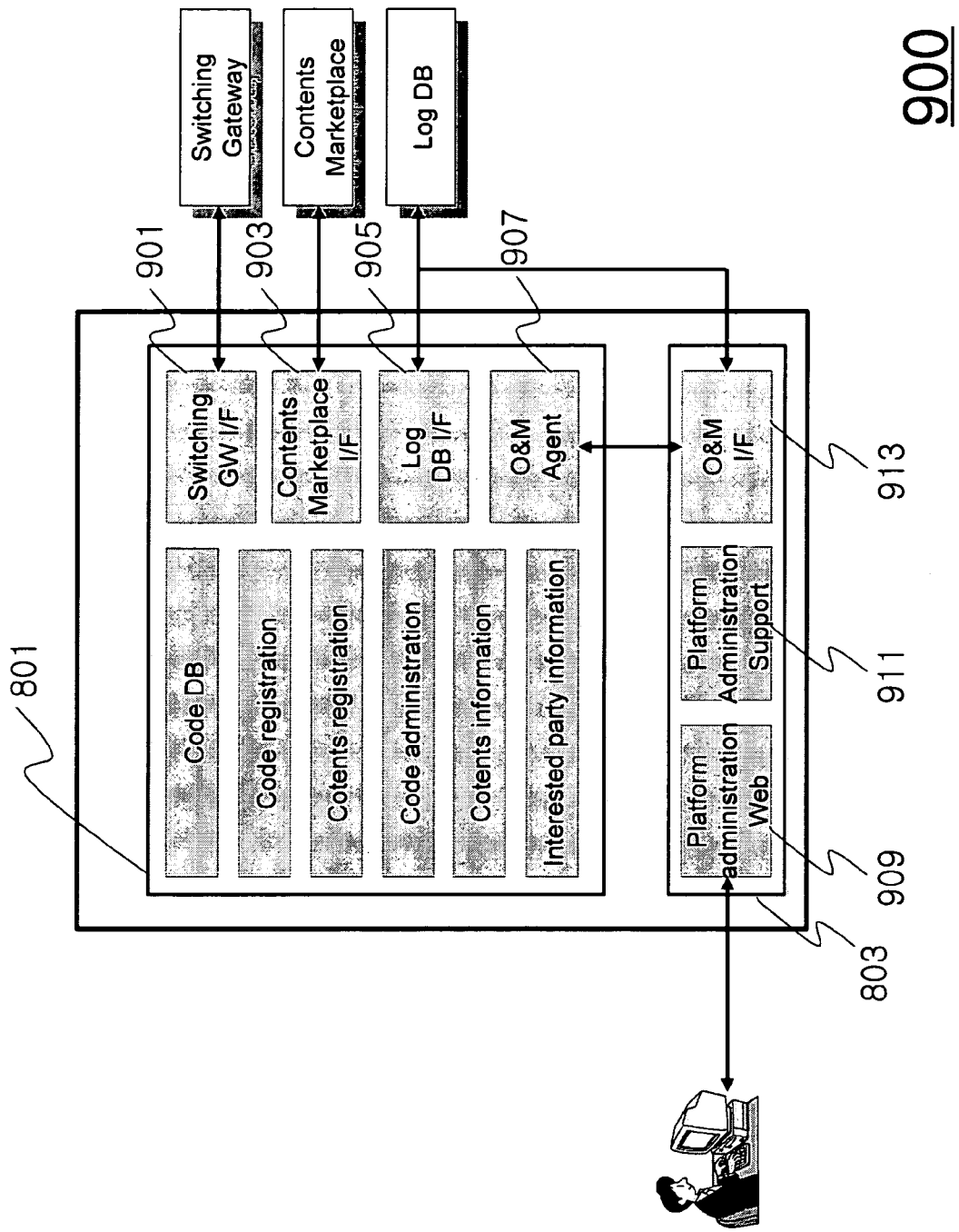
FIG. 9 is a block diagram illustrating the constructions of a distributed switching database and a registration administration module in the communication entity platform shown in FIG. 8.

FIG. 9 is a block diagram illustrating the constructions of the distributed switching database 801 and the registration administration module 803 in the communication entity platform 305 shown in FIG. 8.

The distributed switching database 801 includes a switching gateway interface unit 901, which is connected to a code database, a code registration module, a contents registration module, a code administration module, a contents information and an interested party information administration module, and the external switching gateway, a contents marketplace interface unit 903 connected to a contents marketplace, a log database interface unit 905 connected to a communication entity log database, and an O&M agent unit 907 connected to a registration administration module.

The distributed switching database 801 includes a code database for storing code values therein, and stores information on various resources such as contents and URL stored therein. The distributed switching database 801 stores information on on-line/off-line interested parties therein. Therefore, a user can transmit code values using a device. The transmitted code values are transmitted from a switching gateway to the distributed switching database 801 of a corresponding communication entity platform. The switching database uses the received code values to search corresponding resource information and then resends the searched resource information to the user device.

The registration administration module 803 includes a manager connection web interface unit 909 for administrating a communication entity platform, a platform administration support function module 911 and an O&M interface unit 913. The registration administration module 803 performs the function of supporting and administrating the platforms.

On-Line Interested Party Module 307

Figure 10:
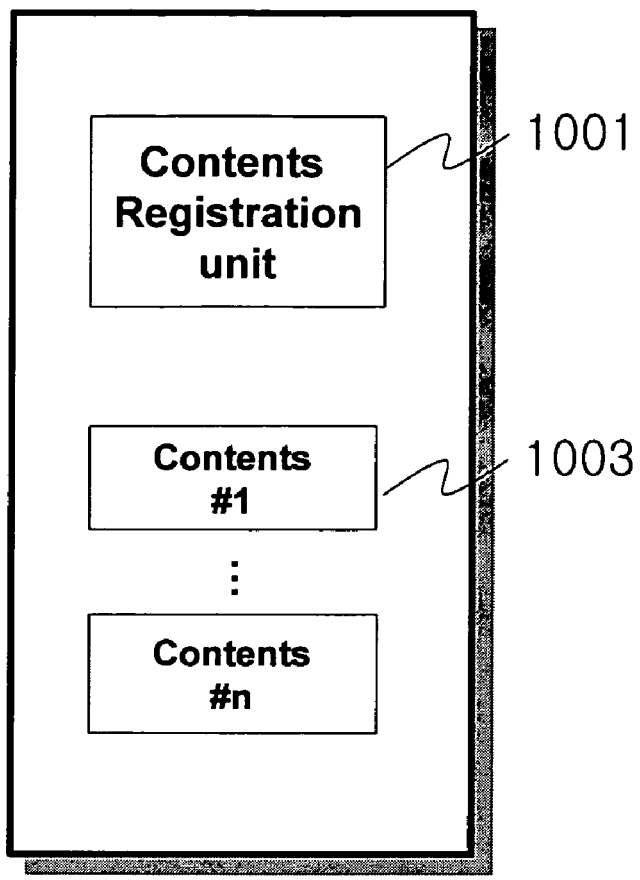
FIG. 10 is a view schematically illustrating the construction of an on-line interested party module in the entire system.

FIG. 10 is a schematic view illustrating the construction of the on-line interested party module 307 in the entire system.

The on-line interested party module 307 is a module for allowing a CP (Contents Provider) to provide its own resource information such as a variety of contents and commerce, which are provided via a communication entity platform.

The on-line interested party module 307 has a contents register 1001 and a variety of resources 1003.

The contents register 1001 is a module for registering resources corresponding to information such as a variety of contents and commerce, which will be provided to users, in the contents index database of the communication entity platform 305, by using a communication entity platform.

The resources 1003 are contents and commerce information owned by the contents providers (CP), if a user recognizes a code, and resources provided to other users. The resources are transmitted to the user device.

According to another embodiment of the present invention, the on-line interested party module may have an internal module of a communication entity platform.

<Off-Line Interested Party Module 309>

Figure 11:
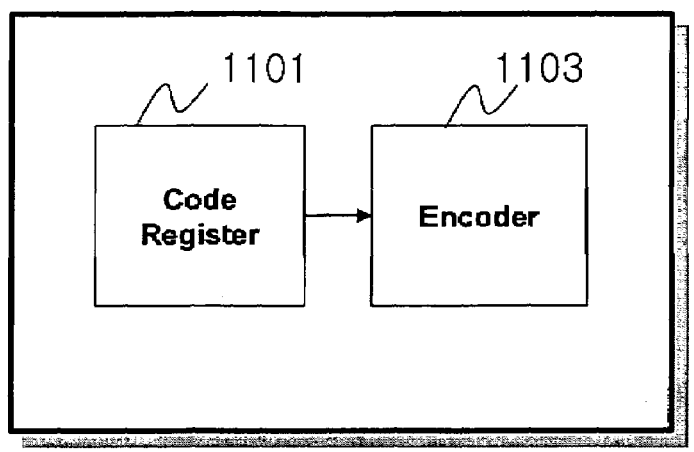
FIG. 11 is a view schematically illustrating the construction of an off-line interested party module in the entire system.

FIG. 11 is a schematic view illustrating the construction of the off-line interested party module 309 in the entire system.

The off-line interested party module 309 is a module of a corresponding off-line interested party that simply selects contents and commerce information that are associated with codes, from an off-line medium company or an off-line sponsor into which the codes will be inserted, and inserts the codes into papers.

The off-line interested party module includes a code register 1101 and an encoder 1103.

The code register 1101 performs the function of searching a variety of contents and commerce data on the basis of a web via the contents marketplace of the operating agent platform so that data to be associated with codes can be easily selected. As in the above, a code corresponding to selected information can be issued to the off-line interested party via the code register and a code such as a paper is inserted into the medium.

The encoder 1103 is a module that receives code values issued by the code register 1101 and outputs them in various formats corresponding to the code values so that the code values can be used in a printing software.

The code values outputted from the encoder 1103 are outputted in an image format via various printing devices such as a printer and are inserted into off-line papers such as papers and handbills.

According to another embodiment of the present invention, the off-line interested party module may have the inner module of the communication entity platform or the inner module of the operating agent platform.

<Entire System of Integrated Platform Structure>

The entire system of the integrated platform structure according to another embodiment of the present invention includes the user device 301, an integrated platform 1201 and the on-line/off-line interested party module 307. The on-line/off-line interested party module 307 may be composed of the on-line interested party module 309 or the off-line interested party module 311, like the distributed platform structure described above. The on-line interested party module 309 and the off-line interested party module 311 can be also integrally operated.

Generally, the user device and the on-line/off-line interested party modules are same as the entire system of a dual DB structure.

Hereinafter, the integrated platform of the present system will be described.

<Integrated Platform>

Figure 12:
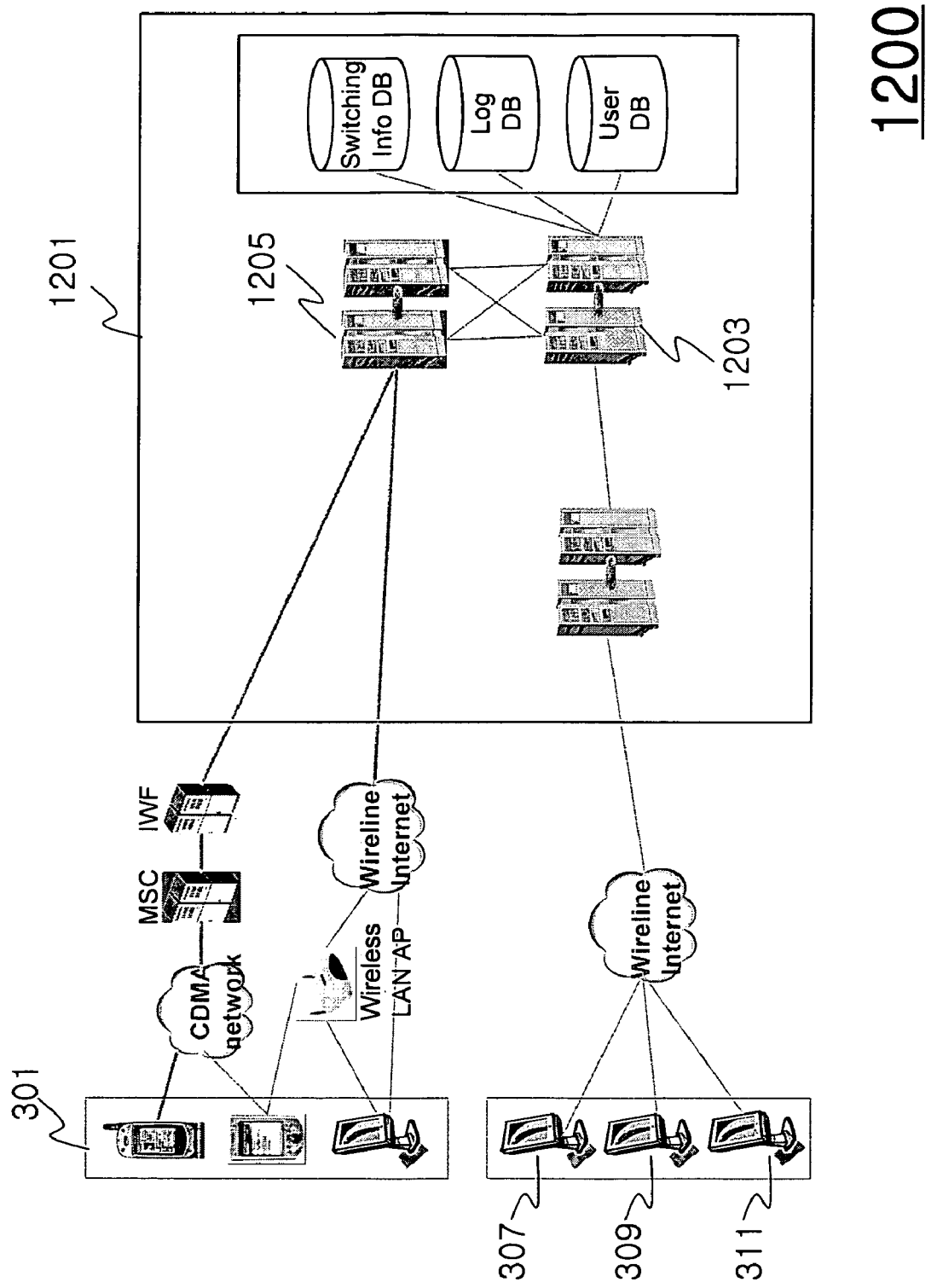
FIG. 12 is a view illustrating the configuration of the entire system according to another embodiment of the present invention.

FIG. 12 is a view illustrating the configuration of the entire system according to another embodiment of the present invention.

Unlike the entire system shown in FIG. 3, the entire system according to this embodiment has one platform 1201. This is a structure in which an operating agent entity platform and a communication entity platform are integrated. It is thus possible for the communication entity to perform a series of functions performed in the operating agent entity. In other words, the platform module of the operating agent employs an internal data center and a neutral IDC (Internet Data Center) of the communication entity.

The entire system in the present embodiment is different from the distributed platform shown in FIG. 3 in that the switching gateway 501 disposed in the platform of the operating agent, for performing a switching function to a distributed switching database of each communication company, is integrated with a switching database and is operated as a single equipment.

Therefore, the switching database shown in FIG. 12 performs all the functions of the switching gateway and the switching database shown in FIG. 3.

It is preferred that all the servers in the entire system are installed dually in preparation for malfunction.

Structure

The entire system according to this embodiment has the user device 301, the integrated structure platform 1201 and the on-line/off-line interested party modules 307.

The on-line/off-line interested party module 307 may have the on-line interested party module 309 or the off-line interested party module 311. The on-line interested party module 309 and the off-line interested party module 311 can be integrally operated.

Each module shown in FIG. 12 may have a variety of networks including a CDMA communication network, wireless communication network and the like.

The integrated structure platform 1201 includes an integrated switching database 1203 in which the switching gateway 501 and the switching database 505 in FIG. 3 are integrally constructed, an interface unit 1205, a rendering engine, a contents marketplace, a registration administration module and a plurality of databases.

Function

When comparing the operating agent platform shown in FIG. 3 and the entire system of a structure distributed into communication entity platforms, a switching gateway of an operating agent that serves connection to a corresponding communication entity is omitted in this embodiment. In this case, in this embodiment, a device of a specific communication entity is directly connected to a server of a corresponding communication entity since an IP address of the server in the communication entity corresponding to the interface module of the device is written. It is thus possible to provide services even if the switching gateway is omitted in the medium.

In addition, in the integrated platform structure of FIG. 12 in this embodiment, the functions of transmitting code values received from the user device 301 to the switching database and transmitting URL resources such as contents and commerce corresponding to codes from the switching database to the switching gateway, are omitted since the switching gateway and the switching database are integrated into a single module.

Functions of other modules are same as those in FIG. 3.

According to another embodiment of the present invention, a user device can transmit the received code directly to a corresponding communication entity platform or to the corresponding communication entity platform via the operating agent platform, by referring to an IP address of the communication entity platform that is written in an interface unit of the user device, when transmitting the code according to a predetermined set value. It is to be understood that this process may be selective.

Code Issue

A code issue process according to the present invention includes a contents registration process of registering contents that are to be provided by an on-line interested party of a contents index database, a code value issue process of issuing a code value associated with the contents, and a database registration process of registering resources such as code values and contents issued in the code value issue step in a database.

The code issue process may be different depending on a business model.

Hereinafter, the code issue process will be examined by dividing it into news, an advertising applied model, a product applied business model and a business model having both on-line/off-line.

New Advertising Applied Business Model (Off-Line Interested Party)

Figure 13:
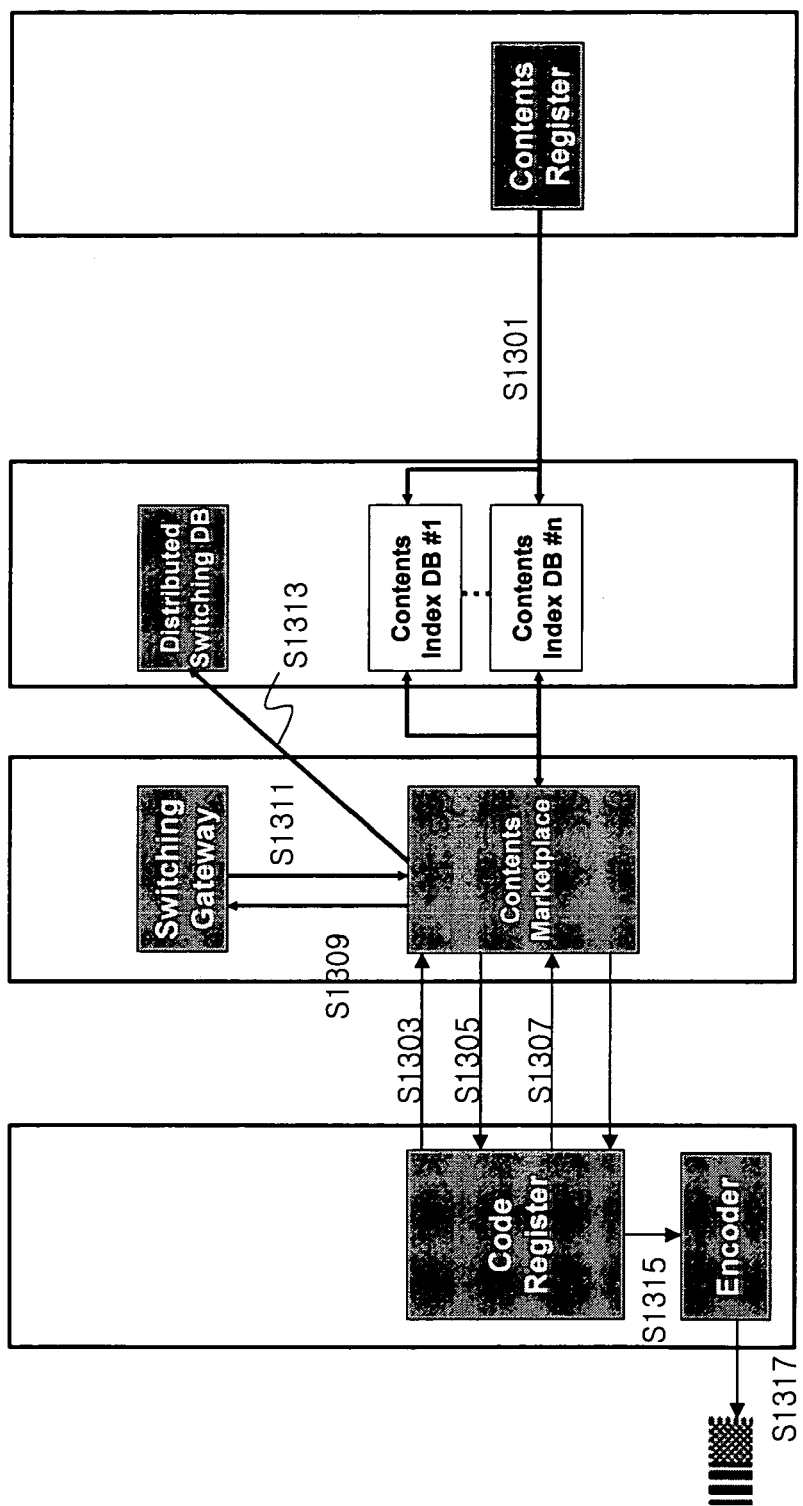
FIG. 13 is a flowchart for explaining a code issue process according to an embodiment of the present invention.

FIG. 13 is a flowchart for explaining a code issue process for the medium of an off-line interested party according to an embodiment of the present invention.

The on-line interested party registers contents whose codes will be connected to the contents index database 811 of the communication entity platform by using the contents register 1001 (S1301).

The off-line interested party accesses the contents marketplace 507 of the operating agent platform using the code register 1001 and then inputs a contents search word, which need to be connected to the code, or a web based browsing search word (S1303).

The contents marketplace 507 transmits the search word inputted in the search input step to a contents index database of a communication entity (S1305).

The contents index database of the communication entity sends the searched result to the contents marketplace based on the search word received from the contents marketplace. The off-line interested party selects contents to be connected to a code from the search results received from the contents marketplace and then transmits the selected contents to the contents marketplace again (S1307).

The selected contents are registered in the communication entity corresponding to the contents selected via the contents marketplace (S1309).

The switching gateway issues a code value for a request for registration and registers an ID of the communication entity in the database (S1311).

The code value issued in the above step and resources corresponding to the selected contents are registered in the switching database (S1313).

The code value registered in the step is sent to an off-line interested party. The code register 1101 of the off-line interested party sends the code value to the encoder 1103, which in turn encodes a corresponding code (S1315).

In the above step, the encoded code is imaged and is then inserted into papers, etc. (S1317).

Product Applied Business Model (On-Line Interested Party)

Figure 14:
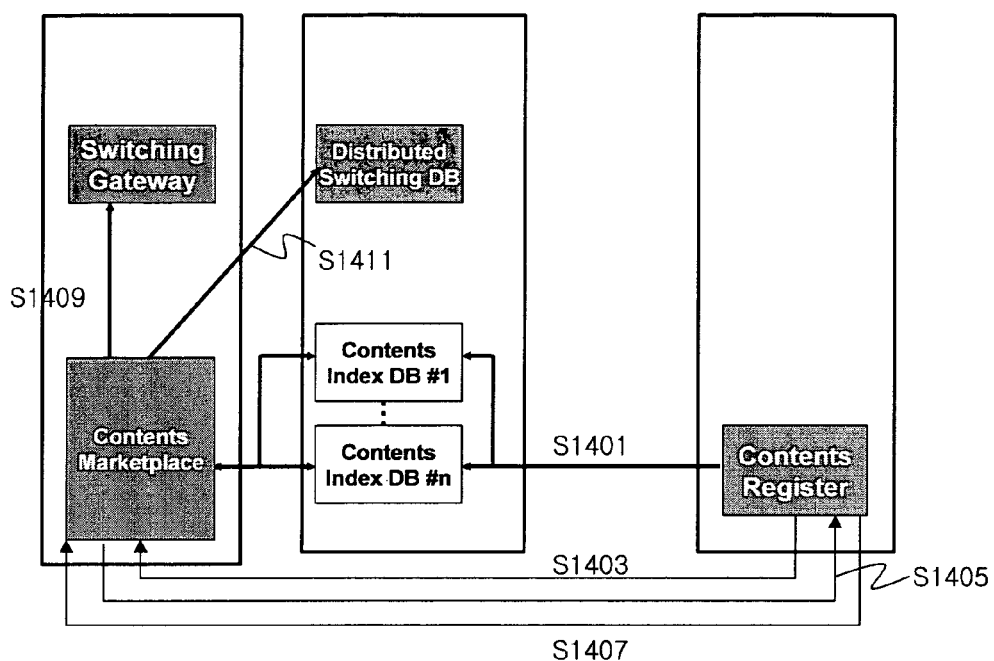
FIG. 14 is a flowchart for explaining a code issue process according to another embodiment of the present invention.

FIG. 14 is a flowchart for explaining a code issue process for the medium of an on-line interested party according to another embodiment of the present invention.

The on-line interested party registers therein contents whose code will be connected to the contents index database 711 of the communication entity platform by using the contents register 901 (S1401).

If the contents are registered through the above process, a product barcode search word or a web-based browsing search word, which will be connected to the registered contents, is inputted (S1403).

Desired product barcode search results, which will be connected through the inputted search word, are received (S1405). The search results received in this process will become product barcode information.

A code to be connected to the contents among the search results received in the step of receiving the search result, is connected (S1407).

A communication entity corresponding to the registered contents and the code that is selected in the above process are registered in the switching gateway (S1409). The registered information may become a code value, select contents, an ID of a support communication entity and the like.

The code values and resources corresponding to the select contents are registered in the switching database (S1411). A representative example will be URL, etc.

Business Model Having Both On-Line/Off-Line

Figure 15:
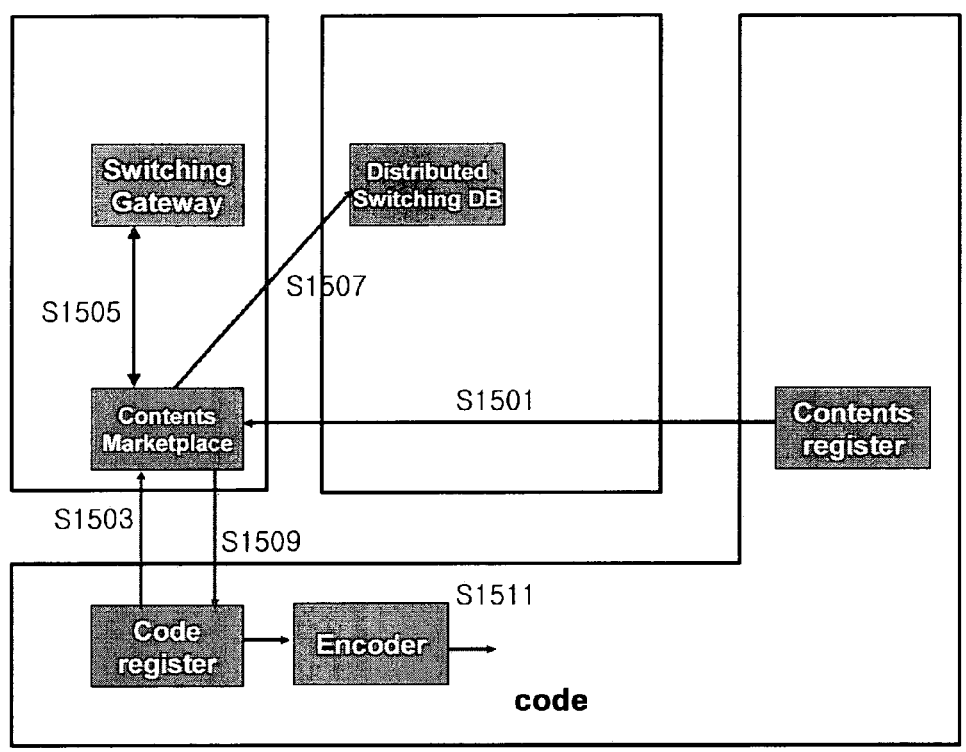
FIG. 15 is a flowchart for explaining a code issue process according to a further embodiment of the present invention.

FIG. 15 is a flowchart for explaining a code issue process in case of a company having both on-line/off-lines.

The contents register 1001 registers resources of contents whose code need to be connected therein (S1501).

A code register requests a code connected to the registered contents (S1503).

A contents marketplace registers a communication entity corresponding to the registered contents in a switching gateway and a switching gateway then issues a code value to the contents marketplace (S1505).

If the contents marketplace sends the issued code value and the selected contents to a distributed switching database, the distributed switching database registers the code value and resources corresponding to the selected contents in the switching database (S1507). In other words, a field value registered in the switching database becomes URL of the code value and the contents and the like.

The code value is sent to the on-line/off-line interested parties again and is transferred to the code register, which in turn transmits the code value to the encoder (S1509).

The encoder encodes the code value to generate a code image, which is then inserted into the paper (S1511).

Code Recognition

A code recognition process is classified into a wireless code recognition process and a wired code recognition process. The wireless code recognition is that a distributed switching database of a communication entity platform is for use in a wireless system. The wired code recognition is that a distributed switching database of a communication entity platform is for use in a wired system.

The code recognition process for each of the wireless code recognition process and the wired code recognition process will be below described.

Wireless Code Recognition

Figure 16:
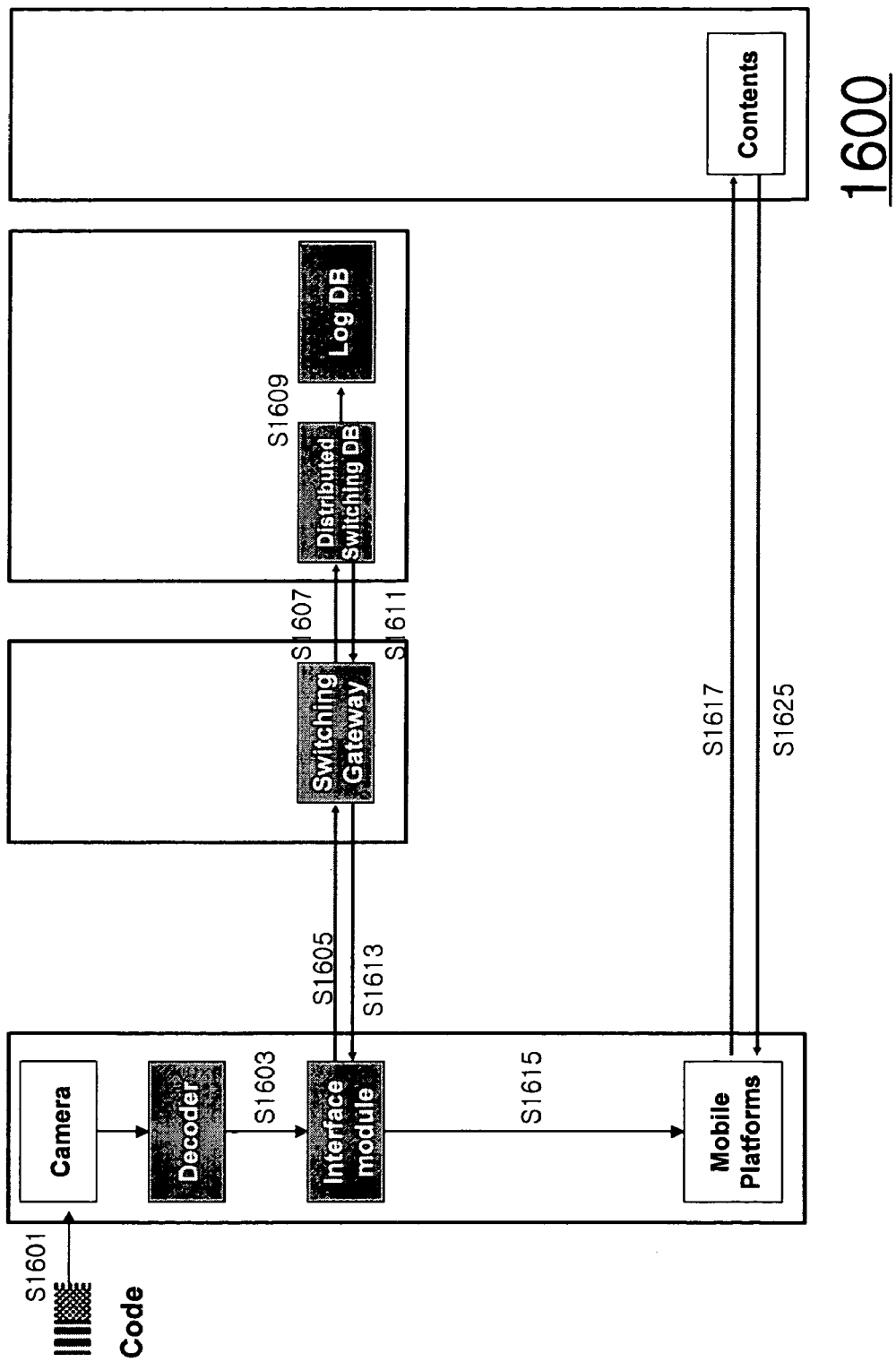
FIG. 16 is a flowchart for explaining a wireless code recognition process.

FIG. 16 is a flowchart for explaining the wireless code recognition process.

This process is that a distributed switching database is for use in a wireless system.

First, a user has various a code image engraved in an object recognized by using a code image acquisition means such as a camera, etc. (S1601). The code image is captured by means of a code recognition acquisition means such as a camera and the like.

A decoder of a user's portable device decodes code values of the code image recognized in the above process and extracts a code value from the decoded code values (S1603).

The extracted code value is sent to a switching gateway through the device's interface module (S1605). At this time, the transmitted information includes information on the user, the code values, the ID of a communication entity and so on.

The switching gateway perceives the ID of the communication entity from the received information and sends the information to platforms of a corresponding communication entity (S1607). The information is transferred to a distributed switching database in the platform system of the corresponding communication entity.

The distributed switching database cooperatively operates along with the log database and has log records stored in the log database (S1609).

Log refers to records on the operation of databases and modules of a system, items for change in system environment, selection of a switch and input/output devices, data inputted by a control desk, information on states or causes when the system is stopped and the like. These are automatically stored in a computer or a log database of a system. Furthermore, when any transaction updates any value of a database, values before the updating and values after the updating are first recorded in a log, and information on the start, end and cancellation of the transaction are recorded in a log.

Information recorded in the log database may be information on users, codes, resources and the like.

After a log-on process for system connection and change in system environment, a distributed switching database returns contents resources mapped to the received code values to the switching gateway (S1611).

The switching gateway resends the resources received from the distributed switching database to the interface module of the user device (S1613).

The interface module of the use device transfers the received resources to the device's mobile platform (S1615).

The mobile platform transfers the resources received from the interface module to an on-line interested party to request contents corresponding to the received resources (S1617).

The on-line interested party transmits the contents for the user's request to the user device (S1625).

Through the above process, the user can receive desired contents using the code image.

Wired Code Recognition

Figure 17:
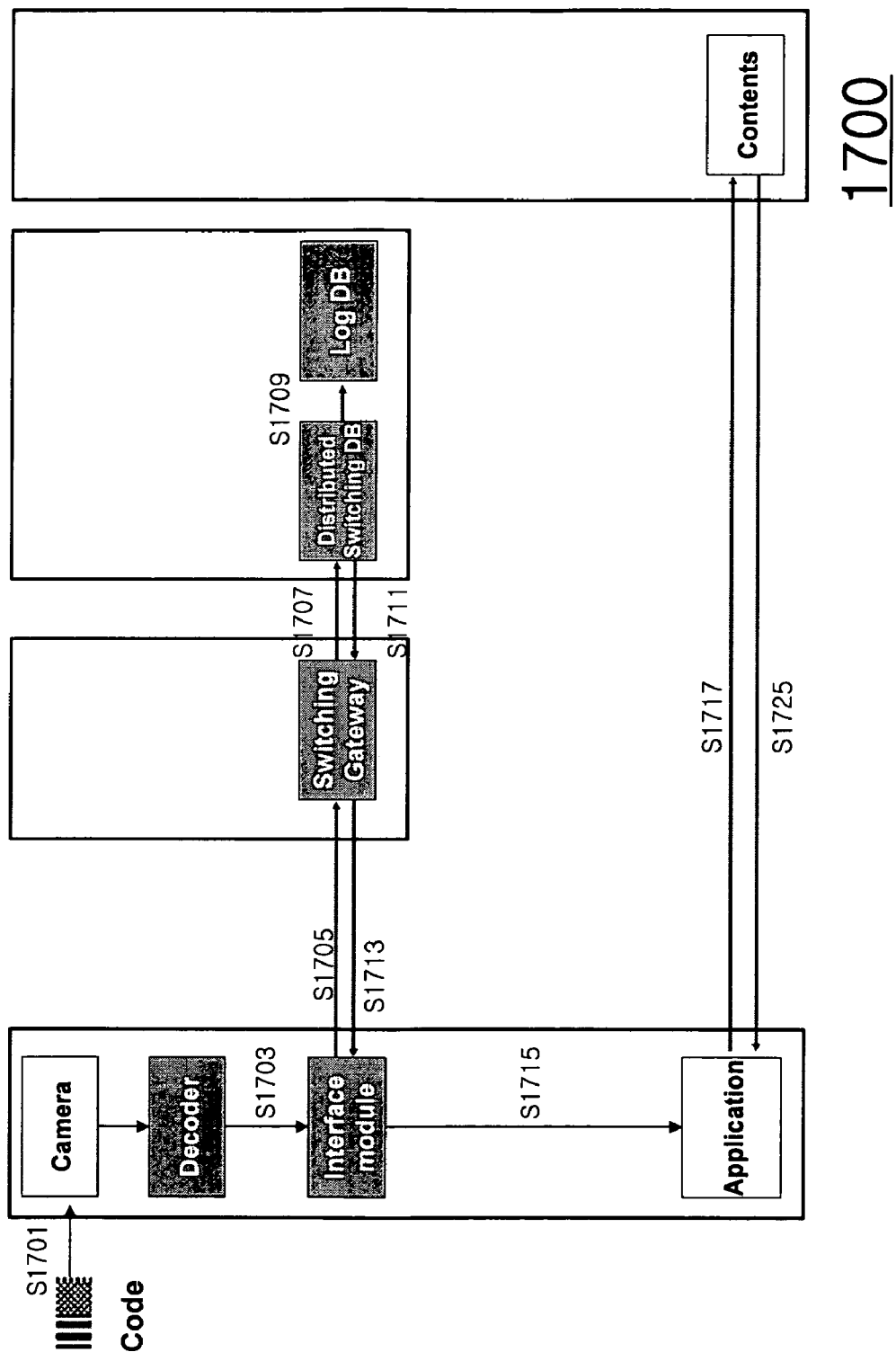
FIG. 17 is a flowchart for explaining a wired code recognition process.

FIG. 17 is a flowchart for explaining the wired code recognition process.

This means that a distributed switching database of a communication entity platform is for use in a wired system.

A user first has various a code image engraved in an object, which are recognized using a code image acquisition means such as a camera (S1701). The code image is captured by a code recognition acquisition means such as a camera.

A decoder of a user's portable device decodes code values of the code image recognized in the above process and extracts code values from the decoded code values (S1703).

The extracted code values are sent to a switching gateway through the device's interface module (S1705). At this time, the transmitted information includes information on the user, code values, an ID of a communication entity and so on.

The switching gateway perceives the ID of the communication entity from the received information and sends the information to platforms of a corresponding communication entity (S1707). The information is transferred to a distributed switching database in the platform system of the corresponding communication entity.

The above process is same as the aforementioned wireless code recognition process.

In the wired code recognition process, the distributed switching database is characterized in that it is a distributed switching database for a wires system.

If services of the communication entity system are ones using a wired network, the distributed switching database may use a wired network switching database of an existing communication entity.

The distributed switching database is associated with a log database and has log records stored in the log database (S1709). The log refers to records on the operation of databases and modules of a system, items for change in system environment, selection of a switch and input/output devices, data inputted by a control desk, information on states or causes when the system is stopped and the like. These are automatically stored in a computer or a log database of a system. Furthermore, when any transaction updates any value of a database, values before the updating and values after the updating are first recorded in a log, and information on the start, end and cancellation of a transaction are recorded in a log.

Information recorded in the log database may be information on users, codes, resources and the like.

After a log-on process for system connection and change in system environment, a distributed switching database returns contents resources mapped to the received code values to the switching gateway (S1711).

The switching gateway resends the resources received from the distributed switching database to an interface module of a user device (S1713).

The interface module of the use device transfers the received resources to the device's mobile platform (S1715).

An application of a web browser, etc. transfers the resources received from the interface module to an on-line interested party or a common web site, thus requesting contents corresponding to the received resources (S1717).

The on-line interested party or the common web site transmits contents requested by the user to the user device (S1725).

Through the above process, the user can receive desired contents using a code image.

Reciprocal Cooperative Operation Interface Between Device and Platform

Hereinafter, a communication interface module between a user device and a platform among the process of transmitting data will be described in more detail.

A reciprocal data transfer interface between the device and the platform performs the function of receiving code values from a decoder, sending the received code values to a platform, and allowing the platform to receive resources such as a variety of contents, commerce, etc. This is accomplished through existing HTTP or socket communications.

If the platform receives a plurality of contents resources, it uses a predetermined menu for allowing a user to select desired contents from the plurality of the contents resources. The platform may have a search engine function to display/output scores or whether they are related.

According to an embodiment of the present invention, a user who wants to receive contents through barcode of a record CD may transmit the barcode of the record CD through the aforementioned code recognition process and received corresponding results. The user also can receive the resources received from the platform as a plurality of contents such as commerce shopping mall, record preview listening, introduction of a singer and the like. The contents can be connected via a predetermined menu.

Service Configuration Using Code and Platform

The provision of services using the code and the platform system becomes a basis to extend wired/wireless Internet regions from an existing web to the ground or more wide region such as products.

A method for providing services using the physical constructions of the aforementioned system will be below described in detail.

It is, however, to be understood that services provided hereinafter are only illustrative according to an embodiment of the present invention, but are not limited to these services. Accordingly, if services are ones that can be provided using the system and codes provided in the present invention, it will be evident to those skilled in the art and fall within the scope of the present invention.

Common services, which can be provided by the present invention, may include services of providing a variety of contents such as VOD, MOD, bell sound, a background screen, games etc., M-Order services such as commerce, home shopping, etc., mobile ticketing services for movie, play, sport, traffic and the like.

Codes, which become the medium for receiving the services, may include papers that can be physically recognized such as papers, webs, TV and the like. In the concrete, the codes may be engraved in off-line media such as news and advertising in papers and magazines, products, etc., and on-line web pages and the like. In some cases, the codes may include both the on-line and off-line.

In addition to the aforementioned services, services of an extended concept such as mobile advertising (M-ad), giro, PIMS (personal information management services), various merchandise coupons, coupon providing services, coupon association games, free mobile services and the like, can be provided using the codes and system provided by the present invention.

Billing System and Method

Figure 18:
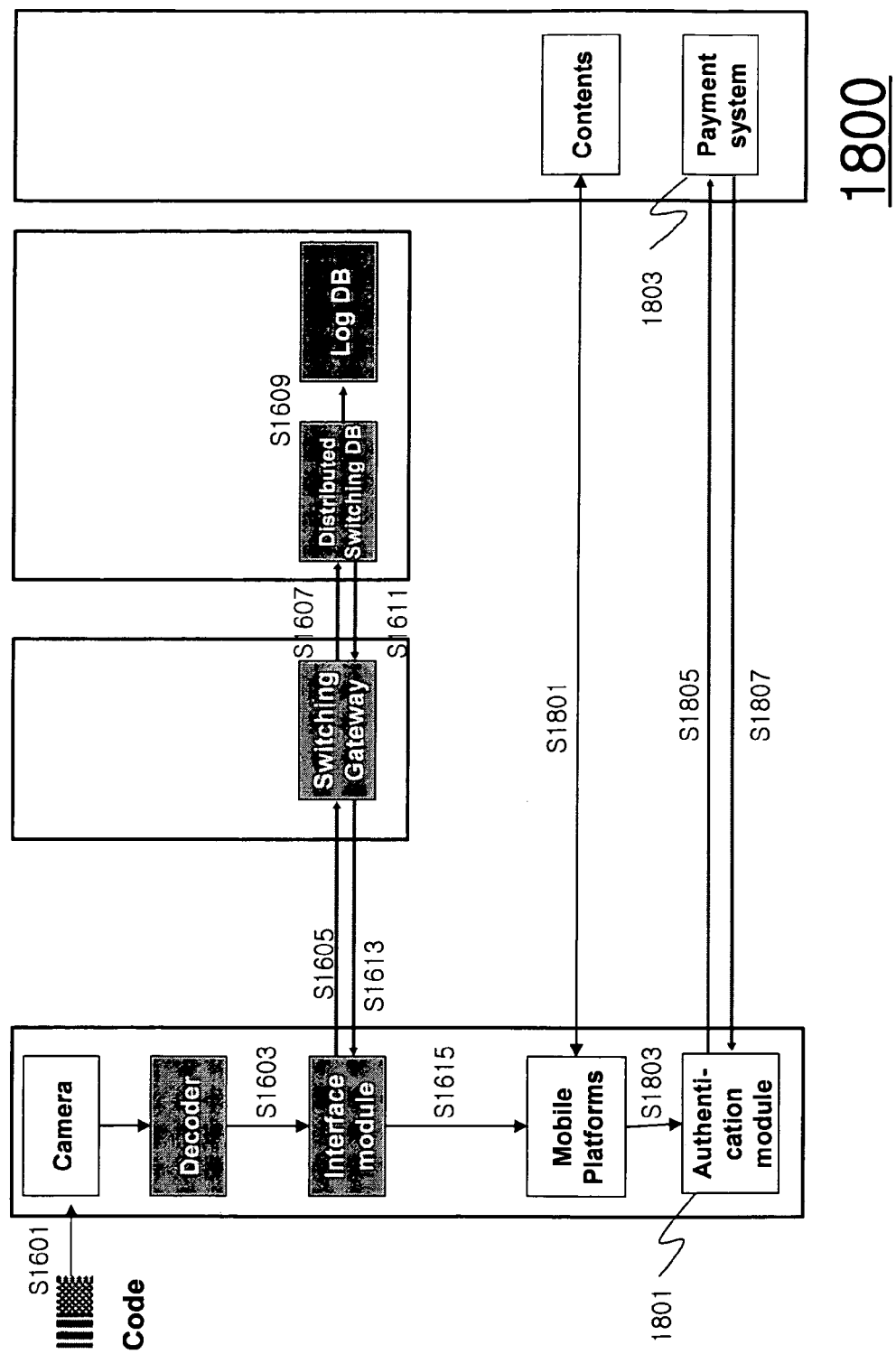
FIG. 18 illustrates a payment cooperation system according to an embodiment of the present invention.

FIG. 18 is view shown to explain the configuration of a payment cooperation system using an existing mobile commerce.

The structure of the payment cooperation system will be first described. In the constituent elements of the existing contents providing system, the portable device 301 further includes an authentication module 1801 and the mobile commerce platform system of the on-line interested party further includes a payment system 1803. The payment cooperation system may use an existing system if an existing mobile commerce system is constructed.

The authentication module 1801 of a user device may be preferably a built-in chip.

The process of requesting code recognition by a user and receiving resources is same as the aforementioned wired/wireless code recognition process.

In response to the request for the resources, the user who received corresponding resources from the platform makes a request for contents corresponding to the resources of a related on-line interested party and receives the requested contents (S1801).

If the user receives the contents, the mobile platform of the user device enables an authentication module to initiate payment authentication. The authentication module may have a built-in chip form (S1803).

If the payment authentication is initiated by the authentication module 1801, the user requests payment authentication to the payment system 1803 of the mobile commerce platform in the on-line interested party (S1805). In this case, personal authentication information is also transmitted.

The payment system 1803 confirms the authentication information and then transmits payment approval information to the authentication module 1801 of the user device (S1807).

Through the above process, the process of paying predetermined service fees provided for the provision of the contents is accomplished.

Payment and Billing of Operating Agent

A predetermined billing process for the user of a platform of an operating agent will now be described.

Figure 19:
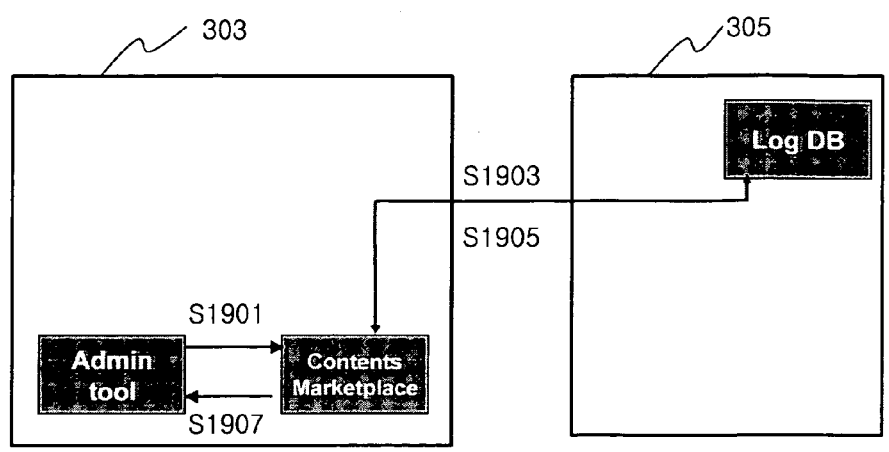
FIG. 19 is a flowchart for explaining a billing process of an operating agent.

FIG. 19 is a flowchart for explaining the billing process of the operating agent.

Since billing for contents can be made using an existing system, the payment and billing of an operating agent means that a contents provider is billed for the use of the platform and profits from the contents provider and users are paid among a corresponding communication entity, an off-line interested party and an operating agent.

The operating agent 303 requests billing and payment to a contents marketplace (S1901). Such a request is made on the basis of a predetermined period according to a prior agreement between providers. It is preferred that the payment is performed during the predetermined period by the month.

In response to the request for the billing and payment of the operating agent 303, the contents marketplace requests a log of a corresponding predetermined period for a log database of a corresponding communication entity (S1903).

The log database transfers corresponding information to the contents marketplace (S1905).

The contents marketplace analyzes the received log information and calculates the amount of the billing and payment by using a total number of uses during a predetermined period and the number of uses by each contents provider (CP). The amount of the billing and payment calculated in the above process is transferred to the operating agent (S1907).

Billing Method for User of Service by User

A billing method for a user is implemented in such a manner that logs for users are analyzed and the number of uses is transferred to an existing fee payment system. It is preferred that the process is performed according to a prior agreement between a subscriber and a service provider even if there is no request of the user.

According to a preferred embodiment of the present invention, information on the number of use for month every user is transferred from a log database of a communication entity to a user fee payment module.

Based on the number of a monthly use transferred thus, the fee for the contents services of the user is billed as a monthly bill by using the fee payment system.

Statistic Process for Various Services

Constituent elements of the communication entity platform shown in FIG. 8 include the CRM module 809 and the log database 805.

The CRM module 809 performs a variety of CRM using user logs and vital statistic data, as described above. The CRM module is a module that writes various statistic data, etc. for the use by the user and provides them to a marketing operator so that the operator can use the data as various indexes and data.

The CRM module can perform a statistic processing trough an after behavior for requesting and analyzing log record information of a user during a predetermined period by using the log database 805.

Figure 20:
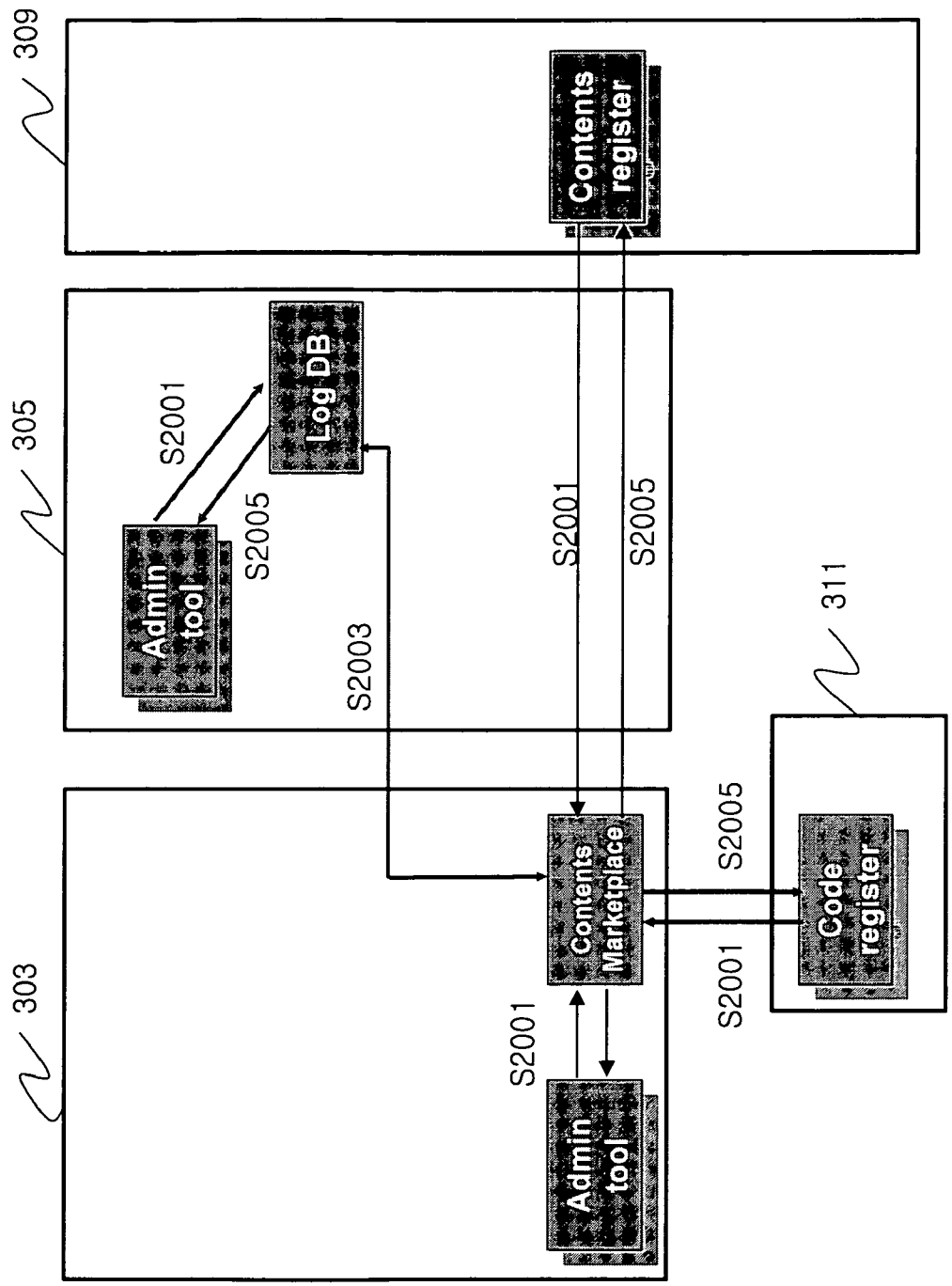
FIG. 20 is a flowchart for explaining a method for processing statistics in the entire system according to the present invention.

FIG. 20 is a flowchart for explaining a method for processing statistics in the entire system according to the present invention.

The communication entity 305, the operating agent 303, the on-line/off-line interested party and the like request statistic for the number of use for a period to a contents marketplace (S2001).

The contents marketplace is connected to the log database to receive a corresponding period log request and corresponding information (S2003).

The contents marketplace analyzes the received information and sends the results to a party who requested a variety of statistic data such as the number of use, etc. (S2005). It is preferred that the provision of the information is performed in a web based system.

It is required that the level of opening the statistic data be controlled considering system operation and business since source information of these statistic data may include personal information, etc.

For example, it is preferred that a communication entity being a system operator uses most materials and the opening level of the operating agent is to open information necessary to agent the operation. Further, it is preferable that an on-line interested party is to open a statistic information level related to the use of own contents and commerce. It would be preferable that an off-line interested party is to open a statistic information level related to code recognition through own media.

Each Code Database

FIG. 21 schematically illustrates the structure of the code database.

The database is constructed so that various services can be provided in such a manner that resources-related information related to codes are previously associated with a switching gateway of a platform and a switching database or a distributed switching database.

Therefore, the code database may be constructed in a table shape in which various information 2117, 2119, 2121, 2123, 2125, 2127 and 2135 related to code values 2115 are mapped on the basis of the code values 2115.

Basic of information 2119, 2121 and 2123 in the database may be information on a product name, a manufacturer, a category, a specification and the like in case of an industrial product 2103; information on a record company, a planning company, etc. in case of a record 2105; information on a director, a film producer, etc. in case of a DVD title 2107; information on a writer, a publishing company, a price and the like in case of a book 2109; information on a genre, an external shape, a manual and so on in case of a game machine and a game media 2111; and information on a manufacturer, a color, a size, etc. in case of a toy 2113.

Extension information 2125, 2127 and 2135 of the database may be information on a product photo, a related URL, etc. in case of the industrial product 2103; information on the title of a song, a sound source, a title photo, etc. in case of the record 2105; information on an actor, a review of movies, a motion picture, a cover photo, etc. in case of the DVD title 2107; information on a review of books, a book photo, etc, in case of the book 2109; information on a director, a film company, etc. in case of the DVD title 2107; information on a writer, a publishing company, a price, etc, in case of the book 2109; information on a character, an item, animation, etc. in case of the game machine and the game media 2111; and information on a character, materials, motion animation, etc. in case of the toy 2113.

In addition to the above, the extension information of the database may be information on price comparison information, a coupon, a product purchase, etc. in case of the barcode.

INDUSTRIAL APPLICABILITY

According to the entire platform system of the present invention, there are effects in that a variety of contents and information of on-line/off-line interested parties can be more easily provided to users, and a system related to contents and other additional services can be integrally constructed using platforms.

Furthermore, according to the present invention, wireless Internet access synchronization is provided to users, a variety of inconveniences in using an existing wireless Internet can be solved through services using barcode, and an infrastructure to integrally interconnect a computer and communications, Internet and various media can be constructed.

In addition, the present invention has an effect that a communication service entity can expend off-line medium such as papers, products, etc. to wired/wireless Internet regions through codes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A communication service system for providing a content to a user device by using a code having code value, comprising:
   a user device configured to capture the code value;
   a communication entity platform configured to receive a code value from outside to provide the content information corresponding to the code, and record an interested party-related log that provides the user device the content;
   an operating agent platform configured to receive the code value from the user device and distribute the code value to the communication entity platform;
   an on-line interested party module configured to register resource corresponding to the content in the communication entity platform and provide the content to the user device; and
   an off-line interested party module configured to receive the code value, which is issued by the operating agent platform, and insert the code value after being issued into an off-line medium in order to let a user select information to be associated with the code value.

2. A communication service system for providing a content to a user device by using a code having code value, comprising:
   a user device configured to capture the code value;
   a communication entity platform configured to receive a code value from a user device to provide the content corresponding to the code value, and record an interested party-related log that provides the user device content;
   an on-line interested party module configure to register resource corresponding to the content in the communication entity platform and provide the content to the user device; and
   an off-line interested party module configured to receive a code image corresponding to the code, the code image which is issued by the communication entity platform, and insert the code image after being issued into an off-line medium in order to let a user select information to be associated with the code.

3. A communication service system for providing a content by using a code having code value, comprising:
   a user device configured to capture the code value;
   a communication entity platform configured to receive the code value from outside to provide the content corresponding to the code value, and record an interested party-related log that provides the user device and the content;
   an operating agent platform configured to receive the code value from the user device and distribute the code value to the communication entity platform;
   an on-line interested party module configured to register resource corresponding to the content in the communication entity platform and provide the content to the user device; and
   an off-line interested party module configured to receive the code value, which is issued by the operating agent platform, and insert the code value after being issued into an off-line medium in order to let a user select information to be associated with the code value,
   the user device configured to transmit the code value directly to the communication entity platform by referring to an IP address of the communication entity platform, or to the communication entity platform through the operating agent platform a previously set value, the user device having an interface unit which writes the IP address.

4. The communication service system as recited in any one of claims 1 to 3, wherein
the code is selected from the group consisting of UPC (Universal Product Code), EAN (European Article Numbering), code 39, Interleaved 2 of 5, code 93, code 128, Plessey code, code 11, one-dimensional barcode including Standard 2 of 5 code and PDF-417 code, QR code, a two-dimensional barcode including Data Matrix, and color code.

5. The communication service system as recited in any one of claims 1 to 3, further comprising
a finding pattern region configured to demarcate a code region from entire image of the code, and
a timing pattern region configured to perceive a data region from entire area of the code and perceive location of each cell in the data region, wherein
various data and decoding information of data are inputted to the data region.

6. The communication service system as recited in any one of claims 1 to 3, wherein
the user device includes
a code input means for inputting the code value,
an interface unit for transmitting the code value received from the code input means to an operating agent or a communication entity platforms and for receiving resources corresponding to the code value, and
a mobile platform for reproducing the content and for implementing an application through the code value.

7. The communication service system according to claim 2, wherein
the user device including
a code input means for capturing the code image,
a decoding unit for extracting code value of the code image recognized in the code input means,
an interface unit for transmitting the code value extracted in the decoding unit to an operating agent or a communication entity platforms, and for receiving the resource corresponding to the code value, and
a mobile platform for reproducing the content and implementing an application through the code value.

8. The communication service system as recited in claim 7, wherein
the code input means includes one of a photo sensor, a scanner, a PC camera, a digital camera, a web camera and a CCD/CMOS camera.

9. The communication service system as recited in claim 6, wherein
the mobile platform is selected from the group consisting of WAP, UP and ME (Mobile Explorer), a VOD player, a platform including BREW, WITOP and WIPI, an OS (Operating System) including Palm OS, Symbian OS and Windows CE, and Virtual Machine.

10. The communication service system as recited in claim 7, wherein
the mobile platform is selected from the group consisting of WAP, UP and ME (Mobile Explorer), a VOD player, a platform including BREW, WITOP and WIPI, an OS (Operating System) including Palm OS, Symbian OS and Windows CE, and Virtual Machine.

11. The communication service system as recited in any one of claims 1 to 3, wherein
the operating agent platform includes
a switching gateway configured to receive the code value from the user device and distributes the code value to platforms of a communication service provider;
a contents marketplace configured to issue the code value and searching the content so that the off-line interested party module selects data associated with the code value recorded in an off-line medium by searching the content of the on-line interested party module on a web base, and
a registration administration module configured to perform an operating agent support function.

12. The communication service system as recited in claim 11, wherein
the contents marketplace includes
an internal function module configured to perform payment and billing, statistic, management, and operating maintenance of an interested party.

13. The communication service system as recited in any one of claims 1 to 3, further comprising
a switching database configured to interwork with a switching gateway of the operating agent platform and store various resources including the code value and contents URL,
a switching database module configured to administrate the switching database,
a log database configured to store use state of the switching database, and
a contents index database configured to provide the content that is connectable to the code value so that the content is searchable, wherein
the off-line interested party selects the content.

14. The communication service system as recited in claim 13, wherein
the communication entity platform includes a user fee payment module configured to pay rent during a predetermined period by the user by using a user log.

15. The communication service system as recited in claim 13, wherein
the communication entity platform includes a Customer Relationship Management (CRM) module for performing various CRM by using a user log and demographic data.

16. The communication service system as recited in claim 2, wherein
the communication entity platform includes
a switching database configured to store various resources including code value and contents URL,
a contents marketplace configured to issue the code value and search the content so that the off-line interested party module selects data associated with the code value recorded in the off-line medium by searching the content of the on-line interested party module on a web base,
a registration administration module configured to perform an operating agent support function,
a switching database management module configured to the switching database,
a log database configured to store use state of the switching database, and
a contents index database configured to provide the content that is connectable to the code value so that the content is searchable, wherein
the off-line interested party selects the content.

17. The communication service system as recited in claim 16, wherein
the contents marketplace includes an internal function module configure to perform payment and billing, statistic, management and operating maintenance of an interested party.

18. The communication service system as recited in claim 16, wherein
the communication entity platform includes a user fee payment module configured to pay rent during a predetermined period by the user by using a user log.

19. The communication service system as recited in claim 16, wherein
the communication entity platform includes a CRM module configured to perform various CRM by using user logs and demographic data.

20. The communication service system as in any one of claims 1 to 3, wherein
the on-line interested party module includes
a contents register configured to register the resource corresponding to the content, which is provided to the user, in association with a contents index database of the communication entity platform, and
the content is provided to the user when the user transmits the resource corresponding to the code value.

21. The communication service system as recited in claim 20, wherein
the on-line interested party module includes an internal module of the communication entity platform.

22. The communication service system according to claim 2, wherein
the off-line interested party module includes
a code register configured to search the content and commerce data in association with the contents marketplace so that data to be associated with the code is selectable, and
an encoding unit configured to receive the code value from the code register to output the code image corresponding to the code value so that the code image is usable in a printing software.

23. The communication service system as recited in claim 22, wherein
the off-line interested party module includes either the internal module of the communication entity platform or an internal module of the operating agent platform.

24. The communication service system as recited in any one of claims 1 to 3, wherein
the on-line interested party module and the off-line interested party module are integrally operated.

25. The communication service system as recited in any one of claims 1 to 3, wherein
servers of the platform system are disposed dually.

26. The communication service system as recited in any one of claims 1 to 3, wherein
the user device associated with the system is a wireless portable device including a PC, a PDA, or a cellular phone.

27. The communication service system as recited in any one of claims 1 to 3, wherein
the user device includes an authentication module configured to authenticate a service fee payment, and
the on-line interested party module includes a payment system configured to confirm authentication information received from the authentication module of the user device and transmit payment approval information to the authentication module of the user device.

28. The communication service system as recited in claim 27,
wherein the authentication module of the user device is a built-in chip shape of the user device.

29. The communication service system as recited in claim 13, wherein
the switching database records and stores the resource including contents URL, which will be provided on the basis of the code value, and product information and service information on the code value.

30. The communication service system as recited in claim 16, wherein
the switching database records and stores the content including contents URL, which is provided on the basis of the code value, and product information and service information on the code value.

31. A method for serving contents and information by using a code having code value, comprising:
inputting the code value to a user device;
transmitting the code value corresponding to the code to a communication entity platform;
allowing a switching database of the communication entity platform to resend resource corresponding to the code value to the user device; and
transmitting the resource to the user device and requesting the content corresponding to the resource.

32. The method as recited in claim 31, wherein
the inputting the code value to the user device is by using a character and number input means of the user device, or by reading characters by using a camera.

33. The method as recited in claim 31, wherein
the inputting the code value to the user device includes
inputting an code image of the code by using an image input means of the user device, and
decoding the code image.

34. The method as recited in claim 31, wherein
the transmitting the code value includes transmitting the code value to an interface unit of the user device and transmitting the code value from the interface unit to a switching gateway, and transmitting the code value to a switching database of the communication entity platform.

35. The method as recited in claim 31, wherein
the transmitting the resource includes
receiving the resource from the interface unit of the user device and transferring the resource to a mobile platform of the user device,
transferring the resource received from the mobile platform of the user device to an on-line interested party module or a common web page,
requesting the content and information corresponding to the received resource, and
transmitting the content and the information for the request from the on line interested party module or the common web page to the user device.

36. The method as recited in claim 31, further comprising
transferring information on the use of the content by the user during a predetermined period from the communication entity log database to a user fee payment module, and
allowing a payment system to request the user to pay for the use of the content during the predetermined period.

37. The method as recited in claim 31, further comprising
requesting and analyzing log record information of the user during a predetermined period by using a log database.

38. A method for serving contents and information by using a code having code value, comprising:
registering a content to a contents index database;
capturing the code value;
issuing the code value that is connected to the content; and
registering resource, the issuing the code value including
  searching the content;
  selecting a result searched in the searching the content, and
  registering the result in a communication entity corresponding to the content.

39. A method for serving contents and information by using a code having code value comprising:
  registering a content to a contents index database;
  capturing the code value;
  issuing the code value that is connected to the registering resource;
  transferring the registered code value to an off-line interested party, which encodes the code value; and
  inserting the encoded code value into an off-line medium that prints an off-line medium.

40. The communication service system according to any one of claims 1 to 3, wherein
  the user device including
    a code input means for inputting the code value,
    an interface unit for transmitting the code value received from the code input means to an operating agent platform or a communication entity platform, and receiving the resource corresponding to the code value, and
    a mobile platform for reproducing the content and implementing an application driven by the code value.

41. The communication service system as recited in claim 40, wherein
  the code input means is either a keypad for directly inputting the code value that includes characters, numbers, and symbols, or a camera for reading characters.

42. The communication service system as recited in claim 40, wherein
  the character input means is an image input means for capturing a code image of the code including a decoding unit for extracting the code value of the code inputted to the image input means.

43. A communication service system according to any one of claims 1 to 3, wherein
  the communication entity platform includes
    a switching database configured to store data therein, which become the resource that includes the code value and contents URL, in association with the outside,
    a switching database management module configured to administrate the switching database,
    a log database configured to store use state of the switching database, and
    a contents index database configured to provide the content that is connectable to the code value so that the content is searchable, wherein the off-line interested party selects the content.

44. The communication service system as recited in claim 43, wherein
  the communication entity platform includes a user fee payment module configured to pay rent during a predetermined period by the user by using the user log.

45. The communication service system as recited in claim 43, wherein
  the communication entity platform includes a CRM module configured to perform a variety of CRM by using the user log and demographic data.

46. The communication service system according to any one of claims 1 to 3, wherein
  the operating agent platform includes
    a switching gateway configured to receive the code value from the user device and distribute the code information of the code value to platforms of a communication service provider,
    a contents marketplace configured to issue the code value and search the content so that the off-line interested party module selects data associated with the code recorded in the off-line medium by searching the content of the on-line interested party module on a web base, and
    a registration administration module configured to perform an operating agent support function.

47. The communication service system according to any one of claims 1 to 3, wherein
  the on-line interested party module includes
    a contents register configured to register the resource corresponding to information on the content and commerce, which is provided to the user, in association with a contents index database of the communication entity platform, and
    the content is provided to the user when the user transmits the resource corresponding to the code value.

48. The communication service system as recited in claim 47, wherein
  the on-line interested party module is composed of an internal module of a communication entity platform.

49. The communication service system according to any one of claims 1 to 3, wherein
  the off-line interested party module includes
    a code register configure to search the content and commerce data in association with the contents marketplace so that data to be associated with the code value is selectable, and
    an encoding unit configured to receive the code value from the code register to output the code image corresponding to the code value so that the code image is usable in a printing software.

50. The communication service system as recited in claim 49, wherein
  the off-line interested party module is either an internal module of the communication entity platform or an internal module of the operating agent platform.

* * * * *

UNITED STATES PATENT AND TRADEMARK OFFICE
CERTIFICATE OF CORRECTION

| | | |
|---|---|---|
| PATENT NO. | : 7,613,443 B2 | Page 1 of 1 |
| APPLICATION NO. | : 10/539556 | |
| DATED | : November 3, 2009 | |
| INVENTOR(S) | : Ryu et al. | |

It is certified that error appears in the above-identified patent and that said Letters Patent is hereby corrected as shown below:

On the Title page, in the left column, item (54) and Col. 1 line 1-7, please correct:

from

"(54) CONTENTS AND INFORMATION PROVIDING SERVICE SYSTEM FOR USING A CODE, USER TERMINAL, COMMUNICATION AGENCY PLATFORM, OPERATING AGENCY PLATFORM, ON-LINE RELATION MEMBER MODULE, AND THE METHOD FROM THE SAME"

to

--(54) CONTENTS AND INFORMATION PROVIDING SERVICE SYSTEM FOR USING A CODE, USER TERMINAL, COMMUNICATION AGENCY PLATFORM, OPERATING AGENCY PLATFORM, ON-LINE AND OFF-LINE RELATION MEMBER MODULE, AND THE METHOD FROM THE SAME--

Signed and Sealed this

Twenty-second Day of December, 2009

David J. Kappos
*Director of the United States Patent and Trademark Office*